(12) United States Patent
Kurauchi et al.

(10) Patent No.: US 12,540,978 B2
(45) Date of Patent: Feb. 3, 2026

(54) LITHIUM ION BATTERY LIFETIME PREDICTION METHOD, DISCHARGE CAPACITY RETENTION RATE PREDICTION METHOD, LIFETIME PREDICTION PROGRAM, DISCHARGE CAPACITY RETENTION RATE PREDICTION PROGRAM, AND INFORMATION PROCESSING DEVICE

(71) Applicant: Resonac Corporation, Tokyo (JP)

(72) Inventors: Yuji Kurauchi, Tokyo (JP); Takuya Minami, Tokyo (JP); Yuji Ito, Tokyo (JP); Daisuke Kohno, Tokyo (JP); Hirofumi Inoue, Tokyo (JP); Yoshishige Okuno, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 359 days.

(21) Appl. No.: 18/248,429

(22) PCT Filed: Oct. 12, 2021

(86) PCT No.: PCT/JP2021/037761
§ 371 (c)(1),
(2) Date: Apr. 10, 2023

(87) PCT Pub. No.: WO2022/080377
PCT Pub. Date: Apr. 21, 2022

(65) Prior Publication Data
US 2023/0366936 A1    Nov. 16, 2023

(30) Foreign Application Priority Data
Oct. 15, 2020    (JP) .................... 2020-174106

(51) Int. Cl.
*G01R 31/36*    (2020.01)
*G01R 31/367*    (2019.01)
(Continued)

(52) U.S. Cl.
CPC ....... *G01R 31/3648* (2013.01); *G01R 31/367* (2019.01); *G01R 31/378* (2019.01); *G01R 31/392* (2019.01)

(58) Field of Classification Search
CPC .............. G01R 31/3648; G01R 31/367; G01R 31/378; G01R 31/392
See application file for complete search history.

(56) References Cited

U.S. PATENT DOCUMENTS 8,332,342 B1 * 12/2012 Saha .................... G01R 31/392
706/45
9,316,699 B2 * 4/2016 Baek .................... G01R 31/392
(Continued)

FOREIGN PATENT DOCUMENTS

CN    103389471    11/2013
JP    2010-539473    12/2010
(Continued)

OTHER PUBLICATIONS

Kristen A. Severson et al., "Data-driven prediction of battery cycle life before capacity degradation", Nature Energy, vol. 4, May 2019, 383-391, www.nature.com/natureenergy.

*Primary Examiner* — Ricky Go
(74) *Attorney, Agent, or Firm* — IPUSA, PLLC

(57) ABSTRACT

A lithium ion battery lifetime prediction method executes, by a computer, acquiring training data including cycle measurement data and lifetime data of a battery, learning a lifetime prediction model using the training data with respect to one or more cycle numbers at which a prediction is made, to acquire a set of learned lifetime prediction
(Continued)

models corresponding to the cycle numbers at which the prediction is made, respectively, successively acquiring cycle measurement data for prediction of a battery that is a prediction target, up to the cycle numbers at which the prediction is made, respectively, and inputting the cycle measurement data for prediction acquired up to the cycle numbers at which the prediction is made, to the learned lifetime prediction models of the corresponding cycle numbers at which the prediction is made, and acquiring a probability distribution of a lifetime at the cycle numbers at which the prediction is made, respectively, as an output.

16 Claims, 12 Drawing Sheets

(51) Int. Cl.
　　*G01R 31/378*　　(2019.01)
　　*G01R 31/392*　　(2019.01)

(56) References Cited

U.S. PATENT DOCUMENTS

| | | | |
|---|---|---|---|
| 11,226,374 B2* | 1/2022 | Severson | G01R 31/3648 |
| 12,293,263 B2* | 5/2025 | Engel | G06N 7/01 |
| 2014/0092375 A1 | 4/2014 | Raghavan et al. | |
| 2021/0064456 A1* | 3/2021 | Shetty | G06F 11/008 |
| 2021/0256400 A1* | 8/2021 | Lin | G01R 31/40 |

FOREIGN PATENT DOCUMENTS

| | | |
|---|---|---|
| JP | 2013-217897 | 10/2013 |
| JP | 2019-113524 | 7/2019 |
| JP | 7216870 | 2/2023 |

* cited by examiner

FIG.1
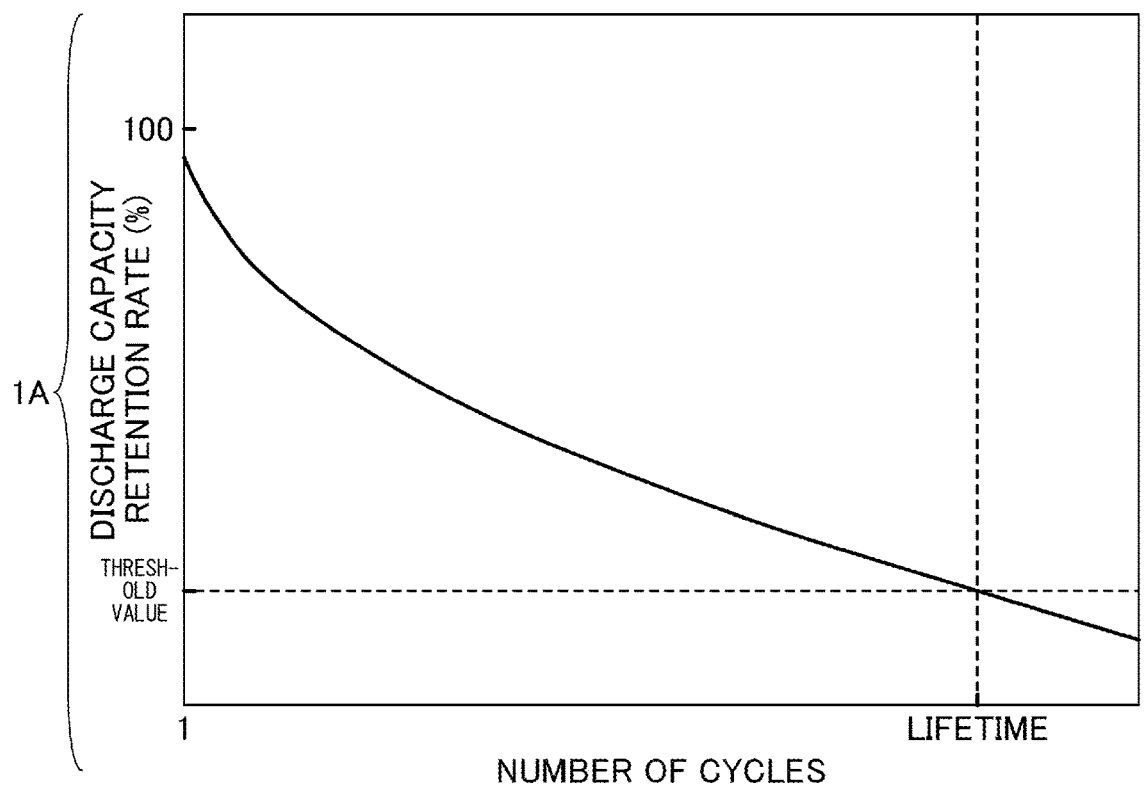
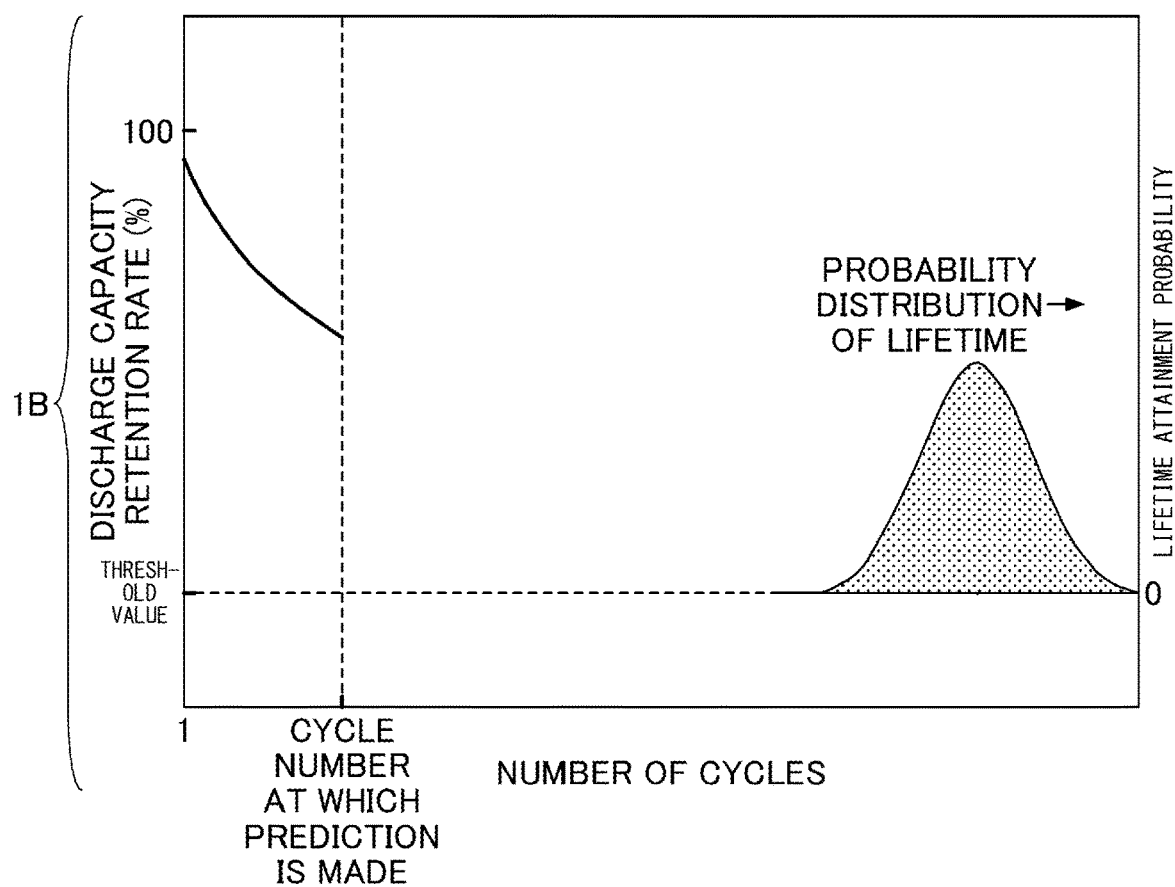

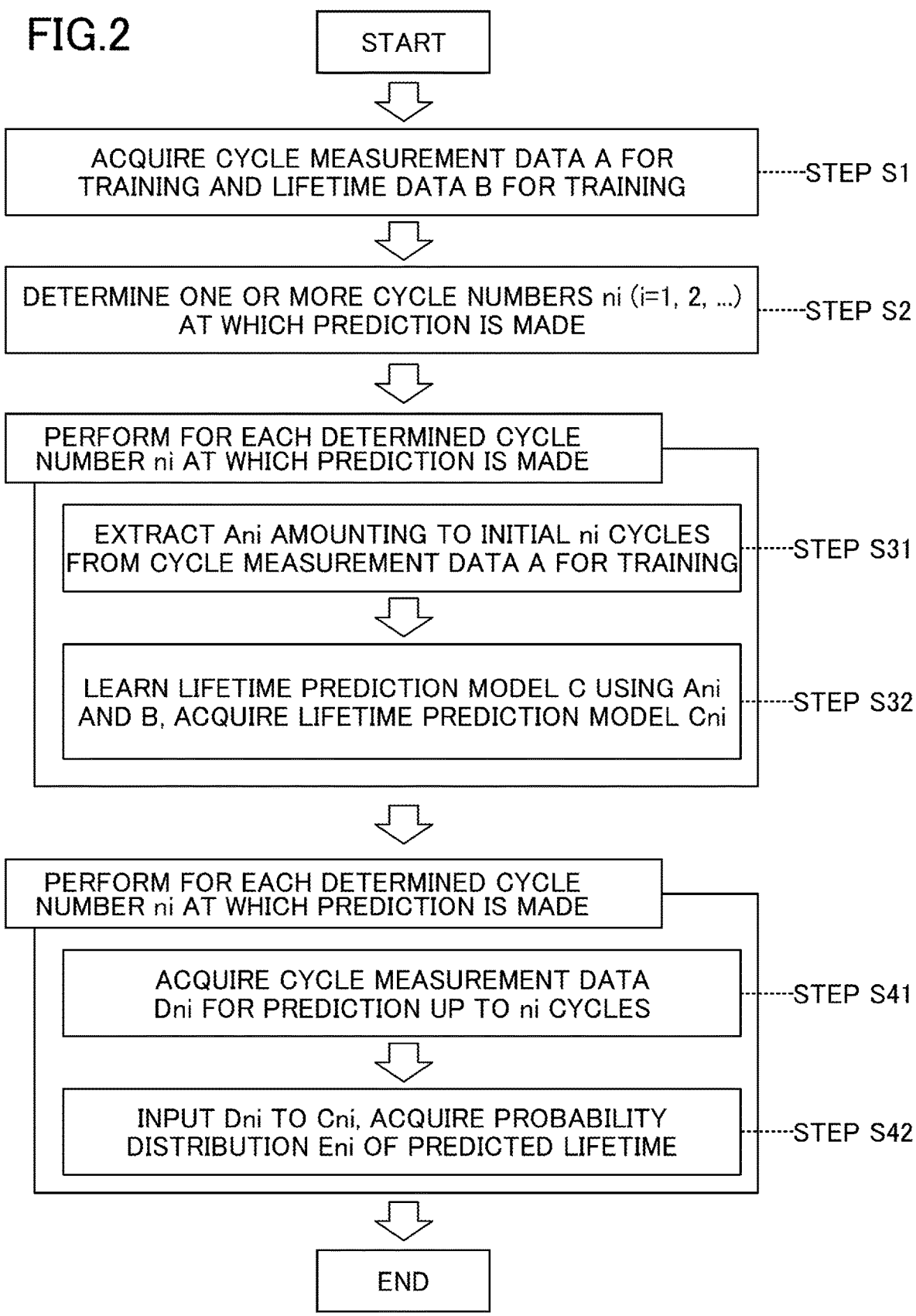

FIG.3

| CYCLE MEASUREMENT DATA | | LIFETIME DATA |
|---|---|---|
| CELL 1 | | CELL 1 |
| CYCLE 1 | CYCLE 2 | LIFETIME = |
| TIME  PHYSICAL  PHYSICAL  ... | TIME  PHYSICAL  PHYSICAL  ... | OO CYCLES |
|         PROPERTY 1  PROPERTY 2 |         PROPERTY 1  PROPERTY 2 | |
| t1      ○           △ | t1      ○           △ | |
| t2      ○           △ | t2      ○           △ | |
| ...                                  | ...                                  | |
| CELL 2 | | CELL 2 |
| CYCLE 1 | CYCLE 2 | LIFETIME = |
| TIME  PHYSICAL  PHYSICAL  ... | TIME  PHYSICAL  PHYSICAL  ... | OO CYCLES |
|         PROPERTY 1  PROPERTY 2 |         PROPERTY 1  PROPERTY 2 | |
| t1      ○           △ | t1      ○           △ | |
| t2      ○           △ | t2      ○           △ | |
| ...                                  | ...                                  | |
| ⋮ | ⋮ | ⋮ |
| CELL N | | CELL N |
| CYCLE 1 | CYCLE 2 | LIFETIME = |
| TIME  PHYSICAL  PHYSICAL  ... | TIME  PHYSICAL  PHYSICAL  ... | OO CYCLES |
|         PROPERTY 1  PROPERTY 2 |         PROPERTY 1  PROPERTY 2 | |
| t1      ○           △ | t1      ○           △ | |
| t2      ○           △ | t2      ○           △ | |
| ...                                  | ...                                  | |

FIG.8
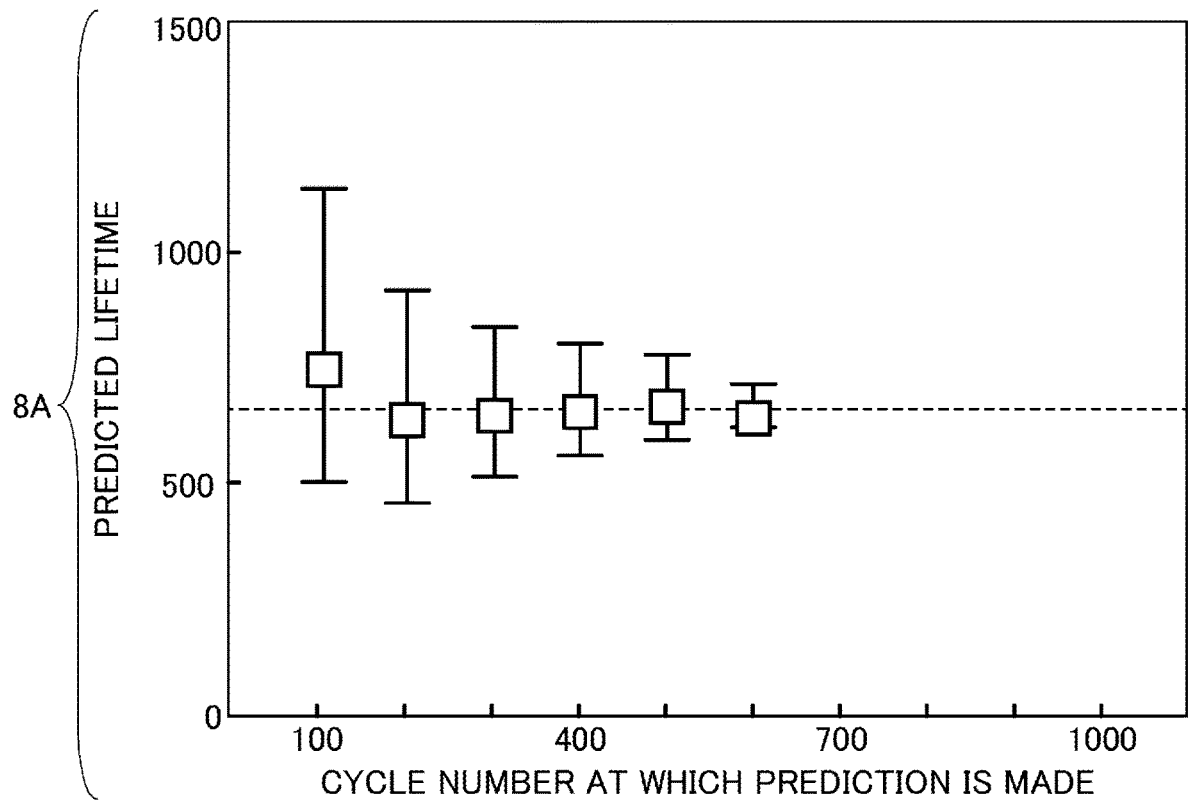
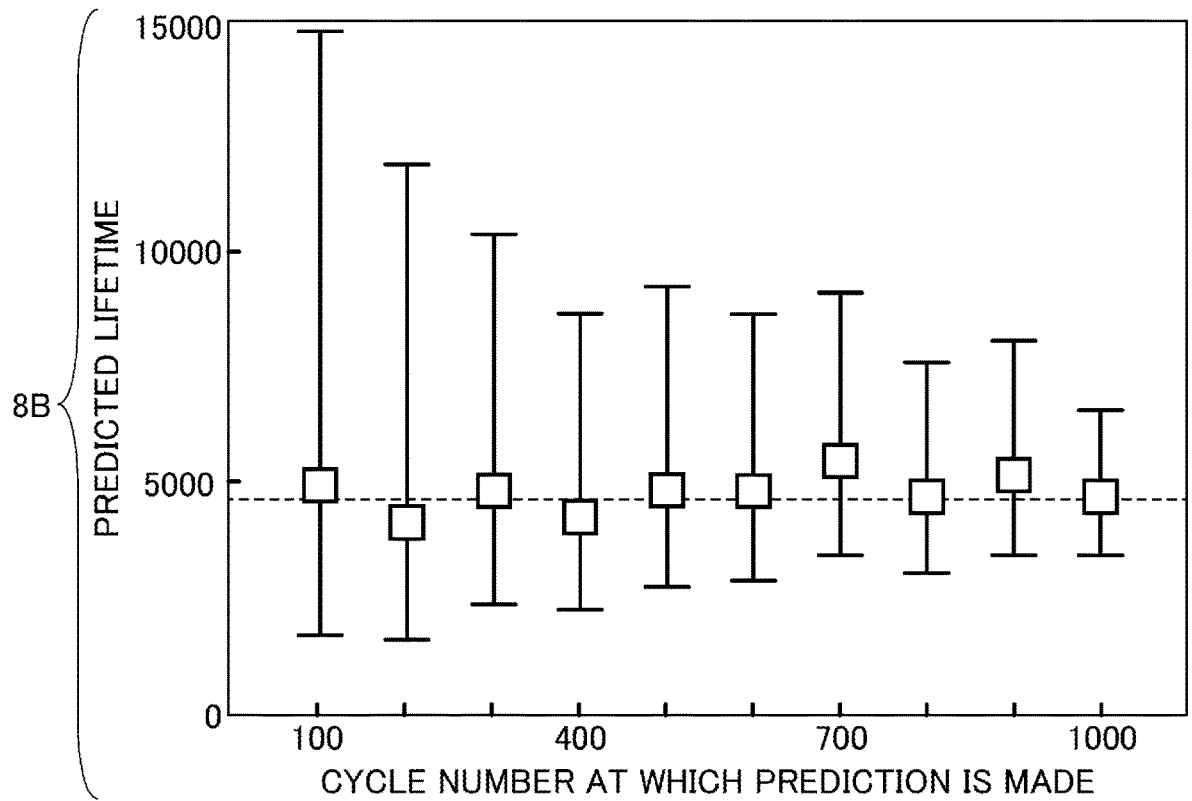

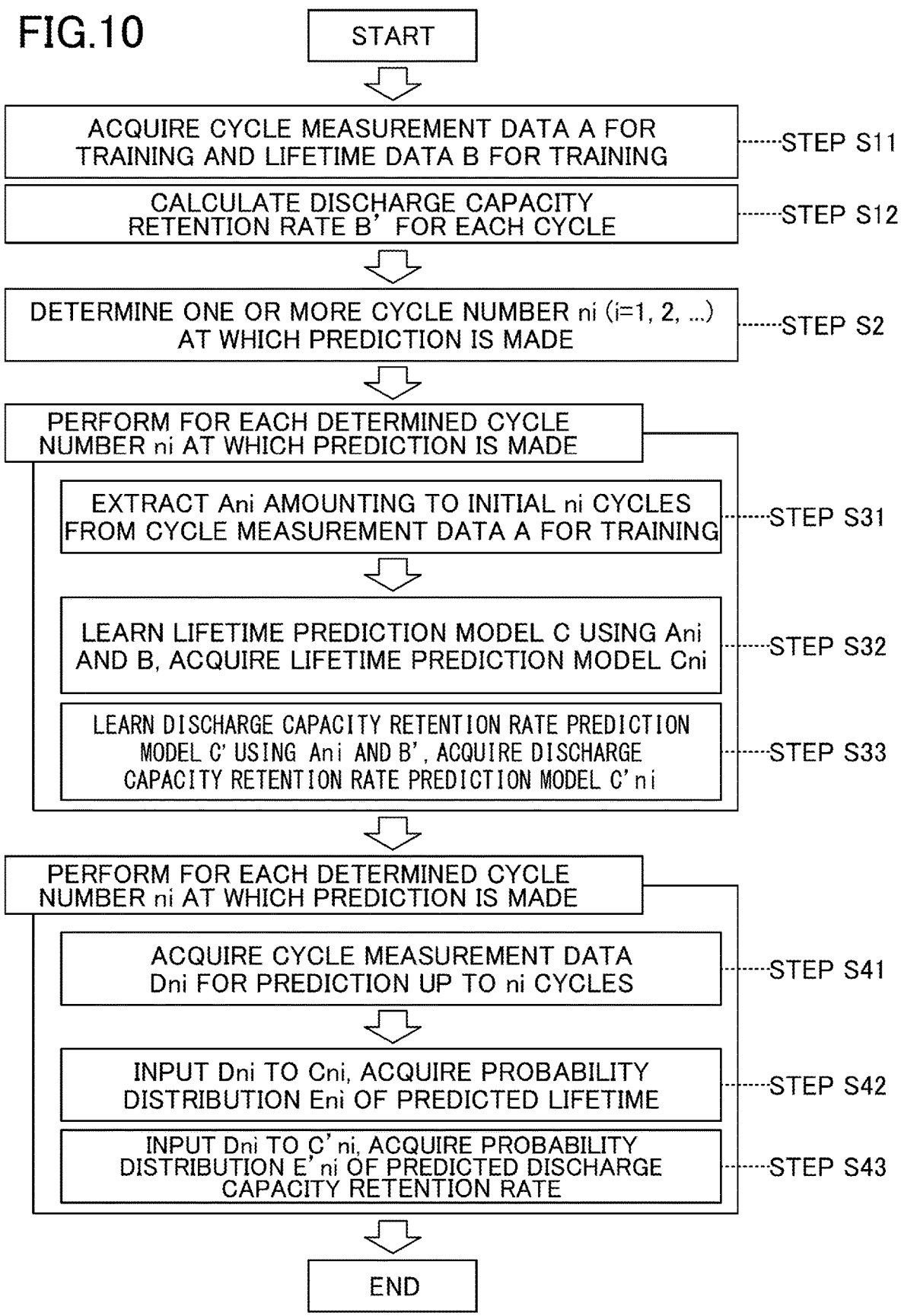

FIG.11

| | CYCLE MEASUREMENT DATA | | | | DISCHARGE CAPACITY RETENTION RATE |
|---|---|---|---|---|---|
| CELL 1 | CYCLE 1 | | CYCLE 2 | ... | CELL 1 |
| | TIME | PHYSICAL PROPERTY 1 | PHYSICAL PROPERTY 2 | TIME | PHYSICAL PROPERTY 1 | PHYSICAL PROPERTY 2 | | Discharge capacity retention rate at cycle m1 = △△<br>Discharge capacity retention rate at cycle m2 = □□<br>... |
| | t1 | ○ | △ | t1 | ○ | △ | | |
| | t2 | ○ | △ | t2 | ○ | △ | | |
| | ... | | | ... | | | | |
| CELL 2 | CYCLE 1 | | CYCLE 2 | ... | CELL 2 |
| | TIME | PHYSICAL PROPERTY 1 | PHYSICAL PROPERTY 2 | TIME | PHYSICAL PROPERTY 1 | PHYSICAL PROPERTY 2 | | Discharge capacity retention rate at cycle m1 = △△<br>Discharge capacity retention rate at cycle m2 = □□<br>... |
| | t1 | ○ | △ | t1 | ○ | △ | | |
| | t2 | ○ | △ | t2 | ○ | △ | | |
| | ... | | | ... | | | | |
| ⋮ | | | | | ⋮ |
| CELL N | CYCLE 1 | | CYCLE 2 | ... | CELL N |
| | TIME | PHYSICAL PROPERTY 1 | PHYSICAL PROPERTY 2 | TIME | PHYSICAL PROPERTY 1 | PHYSICAL PROPERTY 2 | | Discharge capacity retention rate at cycle m1 = △△<br>Discharge capacity retention rate at cycle m2 = □□<br>... |
| | t1 | ○ | △ | t1 | ○ | △ | | |
| | t2 | ○ | △ | t2 | ○ | △ | | |
| | ... | | | ... | | | | |

LITHIUM ION BATTERY LIFETIME PREDICTION METHOD, DISCHARGE CAPACITY RETENTION RATE PREDICTION METHOD, LIFETIME PREDICTION PROGRAM, DISCHARGE CAPACITY RETENTION RATE PREDICTION PROGRAM, AND INFORMATION PROCESSING DEVICE

TECHNICAL FIELD

The present disclosure relates to lithium ion battery lifetime prediction methods discharge capacity retention rate prediction methods, lifetime prediction programs, discharge capacity retention rate prediction programs, and information processing devices.

BACKGROUND ART

In research and development of lithium ion batteries, a charge and discharge cycle test is performed to measure a cycle life of a battery cell, so as to evaluate the materials and design used in the batteries. In FIG. 1, 1A illustrates the cycle life acquired by the charge and discharge cycle test, and the cycle life is acquired as a number of cycles at which a discharge capacity retention rate falls below a threshold value. A majority of the time used in the research and development of the batteries is spent on the measurement of the cycle life, and in order to accelerate the development of the batteries, there are demands for a method capable of quickly predicting the cycle life directly or via the discharge capacity retention rate is required.

As the method for directly and quickly predicting the cycle life of the battery cell, methods of predicting the cycle life from an initial result of the charge and discharge cycle test using a machine learning technique, have been disclosed (Patent Documents 1 and 2). In addition, a method for predicting the cycle life using the machine learning technique based on data including design factors, process factors, and formation factors determined at the time of designing the battery cell, as training data, without performing the charge and discharge cycle test, has been disclosed (Patent Document 3).

PRIOR ART DOCUMENTS

Patent Documents

Patent Document 1: Japanese Laid-Open Patent Publication No. 2010-539473
Patent Document 2: Japanese Laid-Open Patent Publication No. 2019-113524
Patent Document 3: Japanese Laid-Open Patent Publication No. 2013-217897

DISCLOSURE OF THE INVENTION

Problems to be Solved by the Invention

As the method for predicting the cycle life in the research and development of the lithium ion batteries, there are demands to satisfy the following two requirements, from a viewpoint of improving a development efficiency.

First, modifications of the materials and design frequently occur in the research and development. In order to avoid having to again prepare the training data for the machine learning every time such a modification occurs, the training data is required not to depend on the material and design of the battery.

Second, because the cycle life of a current battery cell is several thousand cycles, and effects of an error in such a long-term prediction are large, the predicted cycle life is desirably in the form of a probability distribution.

In the methods disclosed in Patent Documents 1 and 2, measurement data such as a voltage, a current, a charge and discharge capacity, or the like acquired at an initial stage of the charge and discharge cycle test, are used as the training data, and thus, the first requirement described above is satisfied because the training data does not include information on the materials and design of the battery. However, an output of a neural network used in the method disclosed in Patent Document 1 is a single value, and the method disclosed in Patent Document 2 does not present a procedure for predicting the cycle life in the form of the probability distribution. Accordingly, both of these methods do not satisfy the second requirement described above.

The method disclosed in Patent Document 3 does not satisfy the first requirement described above, because data depending on the material and design of the battery are used as the training data.

One object of the present disclosure is to provide a prediction technique for improving the development efficiency of the lithium ion battery.

Means for Solving the Problem

The present invention includes the following configurations.

[1] A lithium ion battery lifetime prediction method, characterized in that a computer executes:
   step (a) of acquiring training data including cycle measurement data and lifetime data of a battery;
   step (b) of learning a lifetime prediction model using the training data with respect to one or more cycle numbers at which a prediction is made, to acquire a set of learned lifetime prediction models corresponding to the cycle numbers at which the prediction is made, respectively;
   step (c) of successively acquiring cycle measurement data for prediction of a battery that is a prediction target, up to the cycle numbers at which the prediction is made, respectively; and
   step (d) of inputting the cycle measurement data for prediction acquired up to the cycle numbers at which the prediction is made, to the learned lifetime prediction models of the corresponding cycle numbers at which the prediction is made, and acquiring a probability distribution of a lifetime at the cycle numbers at which the prediction is made, respectively, as an output.

[2] The lithium ion battery lifetime prediction method according to [1], characterized in that:
   the lifetime prediction model includes
      a data shaping part configured to shape the cycle measurement data into fixed length data,
      a feature extraction part configured to compresses the fixed length data into compressed data,
      a nonlinear conversion part configured to convert the compressed data into nonlinear feature data mapped in a high dimensional space, and
      a regression part configured to receive the nonlinear feature data as an input, and to output the probability distribution of the lifetime, that are coupled in this order.

[3] The lithium ion battery lifetime prediction method according to [2], characterized in that the feature extraction part uses a dimension reduction technique as a data compression technique.

[4] The lithium ion battery lifetime prediction method according to [3], characterized in that the dimension reduction technique is a principal component analysis.

[5] A discharge capacity retention prediction method for a lithium ion battery, characterized in that a computer executes:
- step (a) of acquiring training data including cycle measurement data of a battery and a discharge capacity retention rate in each cycle;
- step (b) of learning a discharge capacity retention rate in each cycle using the training data, with respect to one or more cycle numbers at which a prediction is made, to acquire a set of learned discharge capacity retention rate prediction models corresponding to the cycle numbers at which the prediction is made, respectively;
- step (c) of successively acquiring cycle measurement data for prediction of a battery that is a prediction target, up to the cycle numbers at which the prediction is made, respectively; and
- step (d) of inputting the cycle measurement data for prediction acquired up to the cycle numbers at which the prediction is made, to the learned discharge capacity retention rate prediction models of the corresponding cycle numbers at which the prediction is made, and acquiring a probability distribution of a discharge capacity retention rate at cycles from the cycle numbers at which the prediction is made to a lifetime, respectively, as an output.

[6] A lifetime prediction program for causing a computer to execute:
- step (a) of acquiring training data including cycle measurement data and lifetime data of a battery;
- step (b) of learning a lifetime prediction model using the training data, with respect to one or more cycle numbers at which a prediction is made, to acquire a set of learned lifetime prediction models corresponding to the cycle numbers at which the prediction is made, respectively;
- step (c) of successively acquiring cycle measurement data for prediction of a battery that is a prediction target, up to the cycle numbers at which the prediction is made, respectively; and
- step (d) of inputting the cycle measurement data for prediction acquired up to the cycle numbers at which the prediction is made, to the learned lifetime prediction models of the corresponding cycle numbers at which the prediction is made, and acquiring a probability distribution of a lifetime at the cycle numbers at which the prediction is made, respectively, as an output.

[7] A discharge capacity retention rate prediction program for causing a computer to execute:
- step (a) of acquiring training data including cycle measurement data of a battery and a discharge capacity retention rate in each cycle;
- step (b) of learning a discharge capacity retention rate in each cycle using the training data, with respect to one or more cycle numbers at which a prediction is made, to acquire a set of learned discharge capacity retention rate prediction models corresponding to the cycle numbers at which the prediction is made, respectively;
- step (c) of successively acquiring cycle measurement data for prediction of a battery that is a prediction target, up to the cycle numbers at which the prediction is made, respectively; and
- step (d) of inputting the cycle measurement data for prediction acquired up to the cycle numbers at which the prediction is made, to the learned discharge capacity retention rate prediction models of the corresponding cycle numbers at which the prediction is made, and acquiring a probability distribution of a discharge capacity retention rate at cycles from the cycle numbers at which the prediction is made to a lifetime, respectively, as an output.

[8] An information processing device configured to execute:
- step (a) of acquiring training data including cycle measurement data and lifetime data of a battery;
- step (b) of learning a lifetime prediction model using the training data with respect to one or more cycle numbers at which a prediction is made, to acquire a set of learned lifetime prediction models corresponding to the cycle numbers at which the prediction is made, respectively;
- step (c) of successively acquiring cycle measurement data for prediction of a battery that is a prediction target, up to the cycle numbers at which the prediction is made, respectively; and
- step (d) of inputting the cycle measurement data for prediction acquired up to the cycle numbers at which the prediction is made, to the learned lifetime prediction models of the corresponding cycle numbers at which the prediction is made, and acquiring a probability distribution of a lifetime at the cycle numbers at which the prediction is made, respectively, as an output.

[9] An information processing device configured to execute:
- step (a) of acquiring training data including cycle measurement data of a battery and a discharge capacity retention rate in each cycle;
- step (b) of learning a discharge capacity retention rate in each cycle using the training data, with respect to one or more cycle numbers at which a prediction is made, to acquire a set of learned discharge capacity retention rate prediction models corresponding to the cycle numbers at which the prediction is made, respectively;
- step (c) of successively acquiring cycle measurement data for prediction of a battery that is a prediction target, up to the cycle numbers at which the prediction is made, respectively; and
- step (d) of inputting the cycle measurement data for prediction acquired up to the cycle numbers at which the prediction is made, to the learned discharge capacity retention rate prediction models of the corresponding cycle numbers at which the prediction is made, and acquiring a probability distribution of a discharge capacity retention rate at cycles from the cycle numbers at which the prediction is made to a lifetime, respectively, as an output.

Effects of the Invention

First, even if modifications in the material and design occurs, it is unnecessary to again prepare the training data for the machine learning. Second, because the cycle life or the discharge capacity retention rate is in the form of a probability distribution, the effects of an error in long-term prediction can be reduced.

That is, according to the present disclosure, it is possible to provide a prediction technique for improving the development efficiency of the lithium ion battery.

BRIEF DESCRIPTION OF DRAWINGS 1A of FIG. 1 is a graph illustrating a relationship between a discharge capacitance retention rate and a cycle life acquired by a charge and discharge cycle test. 1B of FIG. 1 is a graph illustrating the discharge capacity retention rate up to a cycle number at which a prediction is made, and cycle measurement data up to the cycle number at which the prediction is made, and a probability distribution of the cycle life acquired using a combination of the present invention.

FIG. 2 is a flow chart illustrating procedures of a lifetime prediction method according to a first embodiment of the present invention.

FIG. 3 is a diagram illustrating structures of cycle measurement data and lifetime data used in the first embodiment of the present invention.

Figure 7:
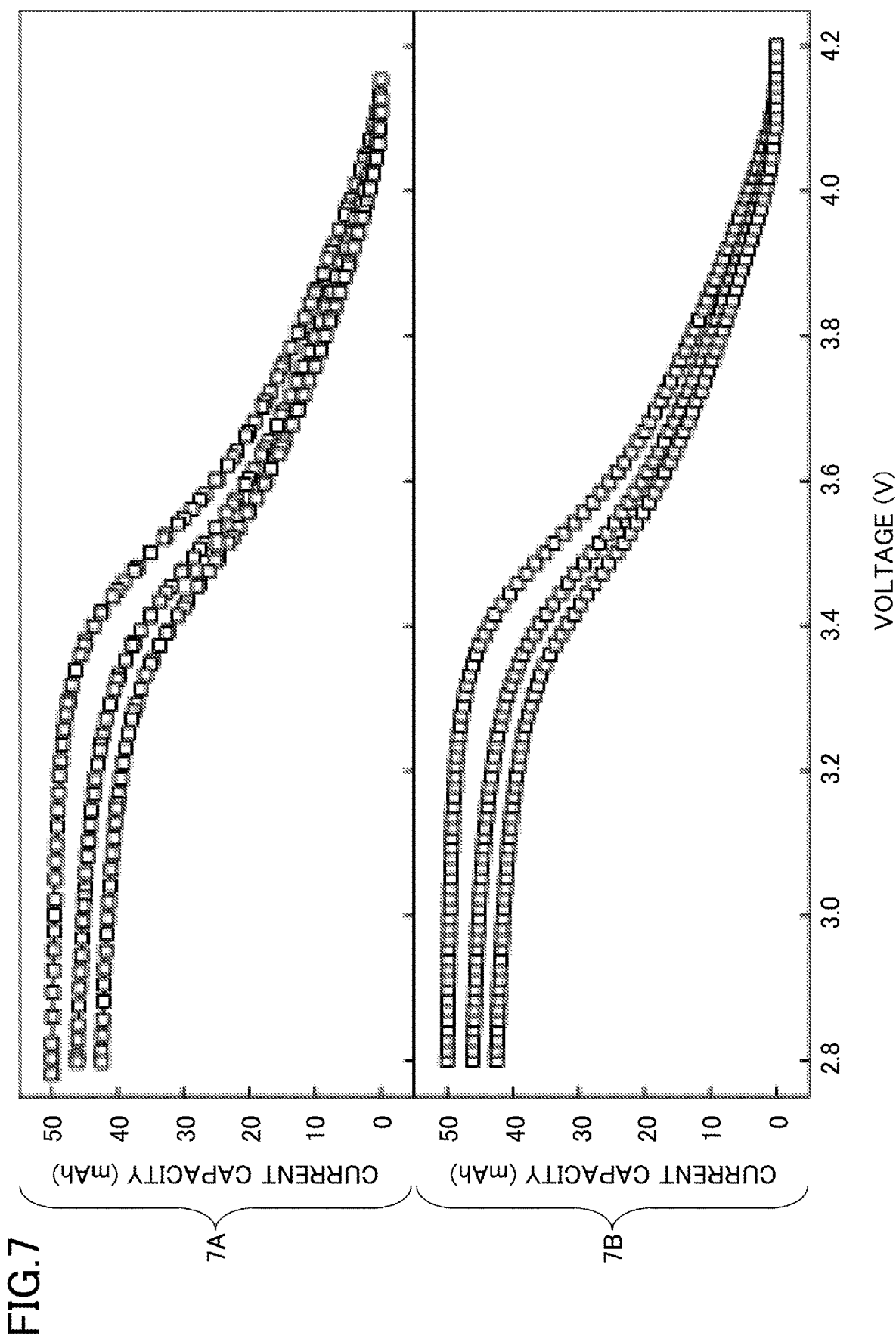

7A of FIG. 7 is a graph of a current capacity in constant current discharge step of a charge and discharge cycle before processing in step (4) of a data shaping part C-1, plotted against the voltage. 7B of FIG. 7 is a graph of a current capacity acquired by resampling at equally spaced voltage sampling points, plotted against the voltage.

FIG. 8 is a graph illustrating lifetime prediction results acquired in the exemplary implementation.

Figure 9:
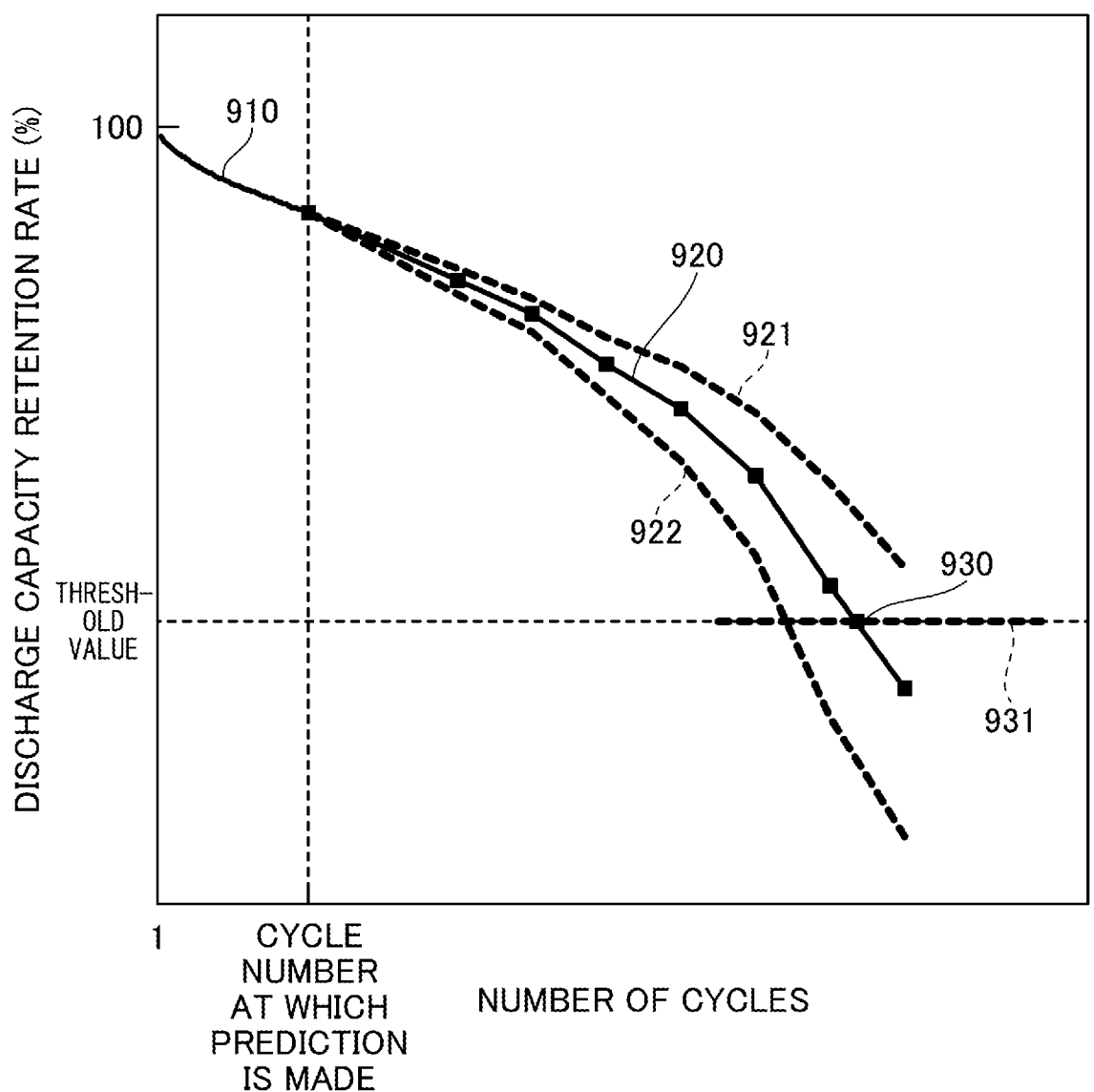

FIG. 9 is a graph illustrating the discharge capacity retention rate up to the cycle number at which the prediction is made, and a predicted discharge capacity retention rate at or after the cycle number at which the prediction is made.

FIG. 10 is a flow chart illustrating procedures of the lifetime prediction method according to a second embodiment of the present invention.

FIG. 11 is a diagram illustrating structures of the cycle measurement data and discharge capacity retention rate data used in the second embodiment of the present invention.

Figure 12:
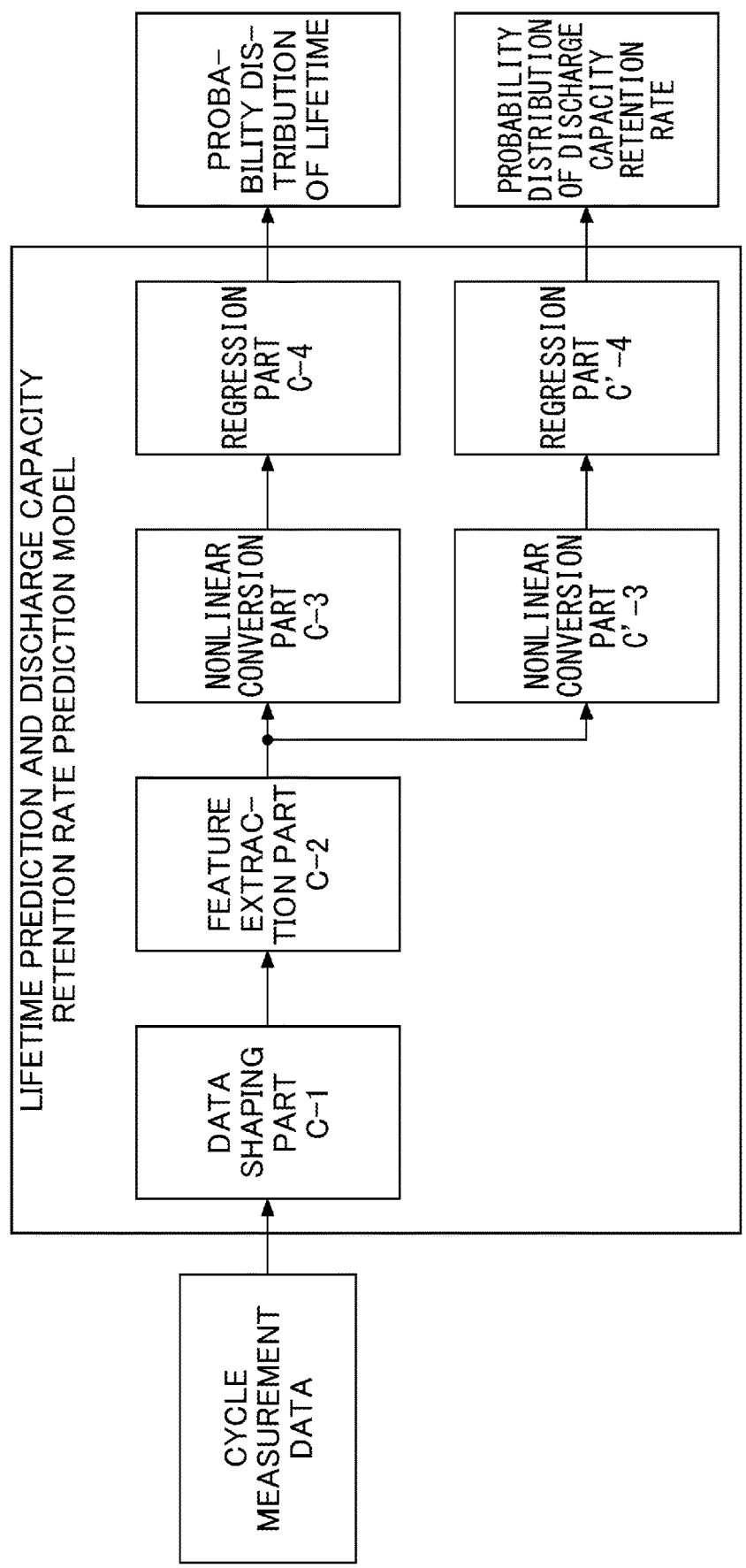

FIG. 12 is a block diagram schematically illustrating a structure of a lifetime prediction and discharge capacity retention rate prediction model used in the second embodiment of the present invention.

MODE OF CARRYING OUT THE INVENTION

Hereinafter, embodiments will be described with reference to the accompanying drawings. In order to facilitate understanding of the description, constituent elements that are the same are designated by the same reference numerals as much as possible in the drawings, and a redundant description of the same constituent elements will be omitted.

First Embodiment

A lithium ion battery lifetime prediction method according to the present invention includes step (a) of acquiring training data including cycle measurement data and lifetime data of a battery, step (b) of learning a lifetime prediction model using the training data with respect to one or more cycle numbers at which a prediction is made, to acquire a set of learned lifetime prediction models corresponding to the cycle numbers at which the prediction is made, respectively, step (c) of successively acquiring cycle measurement data for prediction of a battery that is a prediction target, up to the cycle numbers at which the prediction is made, respectively, and step (d) of inputting the cycle measurement data for prediction acquired up to the cycle numbers at which the prediction is made, to the learned lifetime prediction models of the corresponding cycle numbers at which the prediction is made, and acquiring a probability distribution of a lifetime at the cycle numbers at which the prediction is made, respectively, as an output.

FIG. 2 is a flow chart for explaining steps (a) through (d) in detail, wherein step (a) corresponds to step S1, step (b) corresponds to steps S31 and S32, step (c) corresponds to step S41, and step (d) corresponds to step S42, respectively. Hereinafter, the lithium ion battery lifetime prediction method according to the present invention will be described with reference to FIG. 2.

As illustrated in FIG. 2, the lithium ion battery lifetime prediction method according to the present invention includes step S1 of acquiring cycle measurement data A for training, and lifetime data B for training, step S2 of determining one or more cycle numbers $n_i$ ($i=1, 2, \ldots$) at which a prediction is made, step of performing, for each of the cycle numbers $n_i$ at which the prediction is made, determined in step S2, in two steps including step S31 of extracting measurement data $A_{ni}$ amounting to initial $n_i$ cycles from the cycle measurement data A for training, and step S32 of learning a lifetime prediction model C using the extracted measurement data $A_{ni}$ for training and the lifetime data B for training, to acquire a learned lifetime prediction model $C_{ni}$, and step of performing, for each of the cycle numbers $n_i$ at which the prediction is made, determined in step S2, in two steps including step S41 of acquiring cycle measurement data $D_{ni}$ for prediction up to the cycle number $n_i$ at which the prediction is made, and step S42 of inputting the cycle measurement data $D_{ni}$ for prediction to a learned lifetime prediction model $C_{ni}$, to acquire a probability distribution $E_{ni}$ of a predicted lifetime.

In step S1, a charge and discharge cycle test is performed on each cell of a plurality of batteries, to acquire the cycle measurement data A for training, and the lifetime data B for training. A number of cells used for training data acquisition is desirably 50 or greater. Further, in order to acquire the lifetime data B for training, the charge and discharge cycle test is desirably continued until each cell reaches the cycle life.

One cycle of the charge and discharge cycle test always includes a constant current charge step, and a subsequent constant current discharge step. In this state, a constant voltage charge step may be included between the constant current charge step and the constant current discharge step. In addition, a pause step may be included between the charge and discharge steps.

The cycle life is a number of cycles at which the discharge capacity falls below a predetermined threshold value. As an example, this threshold value is 80% of the discharge capacity measured at the first cycle.

FIG. 3 illustrates structures of the cycle measurement data and the lifetime data.

The cycle measurement data is acquired by performing a charge and discharge cycle test on a plurality of cells, and recording sampling times $t_1, t_2, \ldots$, and physical property values at the sampling times $t_1, t_2, \ldots$, in each cycle. The sampling times are desirably selected appropriately, so that it is possible to sufficiently follow changes in the physical property values, and the sampling times may not be set at constant intervals. Items of the physical property value to be recorded always include a voltage applied to the cell and a current flowing through the cell, and further includes at least one physical property value measurable by the physical and chemical characteristics exhibited by the cell. Examples of the physical property values to be recorded include the voltage, the current, and a current capacity.

The lifetime data is a cycle life of each of the cells from which the cycle measurement data are acquired.

In a case where the charge and discharge cycle test is not performed until an end of the cycle life is reached when the cycle measurement data A for training and the lifetime data B for training are acquired in step S1, the cycle life may be estimated using a combination of a transition of the discharge capacity up to the measured charge and discharge cycle, and a mathematical model or a time series data analysis, and the estimated cycle life may be used as the lifetime data B for training. Examples of the mathematical model include the square root function law and the power law that are known for the capacity decays of lithium ion batteries. Examples of the time series data analysis include the autoregressive integrated moving average (ARIMA) model, the Kalman filter, and the Gaussian process regression.

Stored measurement data may be used as the cycle measurement data A for training and the lifetime data B for training that are acquired in step S1.

The cycle number at which the prediction is made, determined in step S2, is the number of charge and discharge cycles in which the charge and discharge cycle of the charge and discharge test is repeated until execution of the prediction of the cell whose lifetime is to be predicted. A plurality of cycle numbers at which the prediction is made, may be selected and determined. The cycle number at which the prediction is made, that is prepared in advance may be used, and step S2 may not be performed.

Steps S31 and S32 are repeated with respect to one or more cycle numbers ni (i=1, 2, . . . ) at which the prediction is made, determined in step S2.

In step S31, the cycle measurement data up to the cycle number ni at which the prediction is made, is extracted from the cycle measurement data A for training acquired in step S1, as the cycle measurement data Ani for training. In a case where there is present a cell included in the cycle measurement data A for training and the lifetime data B for training, for which the measurement is ended before the cycle number ni at which the prediction is made, the data of the cell cannot be used and is therefore excluded.

In the following step S32, the lifetime prediction model C is learned, using the extracted cycle measurement data Ani for training as an explanatory variable, and the lifetime data B for training as a response variable, and the learned lifetime prediction model Cni of the cycle number ni at which the prediction is made, is acquired.

In steps S31 and S32, the learned lifetime prediction model Cni is prepared by learning the cycle measurement data up to the initial ni cycles corresponding to the cycle number ni at which the prediction is made. That is, in a case where a plurality of cycle numbers at which the prediction is made is selected, a plurality of learned lifetime prediction models Cni for each of initial ni cycles corresponding to the cycle numbers ni at which the prediction is made, is learned.

The initial ni cycles is intended to refer to a first cycle to a 200th cycle in the case of initial 200 cycles, for example. The lifetime prediction model C200 is learned by using cycle measurement data A200 for training, acquired by extracting the initial 200 cycles from the first cycle to the 200th cycle of the cycle measurement data A for training, and the lifetime data B for training. The learned lifetime prediction model C200 outputs a probability distribution E200 of the predicted lifetime when the cycle measurement data D200 for prediction up to the cycle number 200 at which the prediction is made are input.

The cycle life, that is a response variable, always assumes a positive numerical value. Hence, when learning the lifetime prediction model C in step S32, it is desirable that the lifetime data B for training is not used as it is for the learning, but converted into a logarithm of B before being used for the learning. in this case, because a prediction result also becomes a logarithm of the lifetime, it is possible to ensure that the predicted lifetime acquired by an inverse conversion becomes a positive numerical value.

Figure 4:
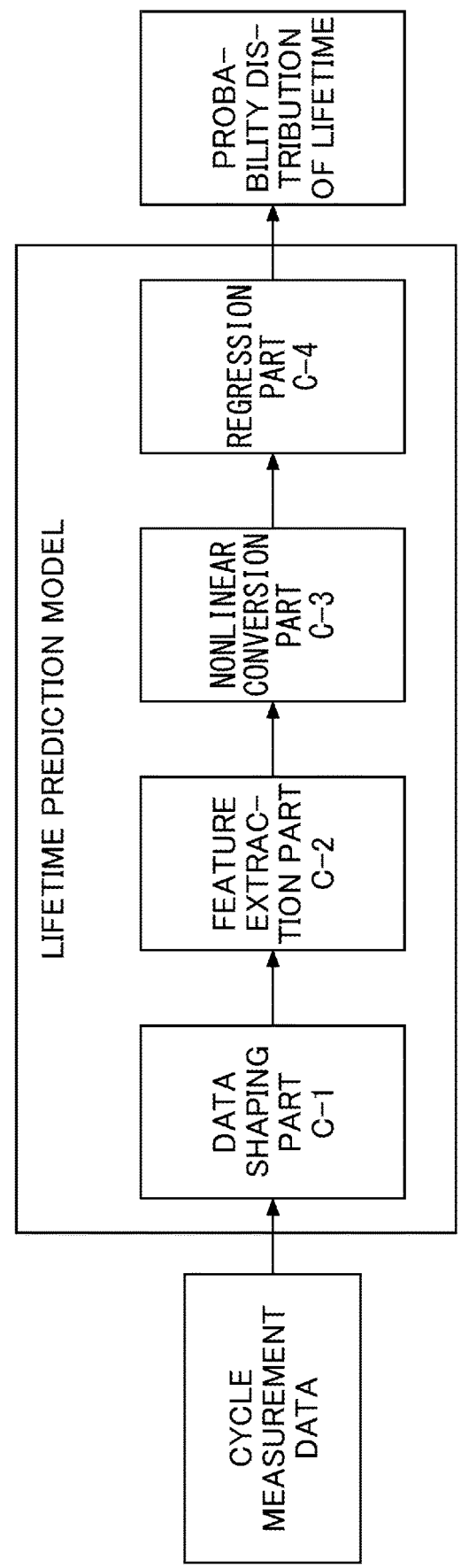
FIG. 4 is a block diagram schematically illustrating a structure of a lifetime prediction model used in the first embodiment of the present invention.

As illustrated in FIG. 4, the lifetime prediction model used in the lithium ion battery lifetime prediction method according to the present invention may have a structure in which a data shaping part C-1, a feature extraction part C-2, a nonlinear conversion part C-3, and a regression part C-4 are connected in this order. The lifetime prediction model receives the prediction cycle measurement data up to the cycle number ni at which the prediction is made, as an input, and outputs a probability distribution of the lifetime. Hereinafter, examples of constituent elements of the lifetime prediction model will be described.

The data shaping part C-1 receives the cycle measurement data up to the cycle number ni at which the prediction is made, as the input, and outputs fixed length data having a matrix format in which the number of rows is the number of cells and the number of columns is a fixed length. The fixed length data having the matrix format is generated by converting the cycle measurement data of each cell into data in which the number of columns is the fixed length, by a shaping process including the following processes (1) through (7), and superimposing the converted data in a row direction.

(1) The shaped data after the shaping can include the physical property values at specific points in time of the charge and discharge cycle test, and values calculated using the physical property values. Items of values included in the shaped data include a charge start voltage of the first cycle, a charge start voltage of a second cycle, . . . , a charge start voltage of a ni-th cycle, a charge time of the first cycle, a charge time of the second cycle, . . . , a charge time of the ni-th cycle, a charge capacity of the first cycle, a charge capacity of the second cycle, . . . , a charge capacity of the ni-th cycle, a discharge capacity of the first cycle, a discharge capacity of the second cycle, . . . , a discharge capacity of the ni-th cycle, an initial coulombic efficiency, a slope and an intercept of a number of cycles versus charge start voltage plot near the ni-th cycle, a slope and an intercept of a number of cycles versus charge time plot near the ni-th cycle, a slope and an intercept of a number of cycles versus charge capacity plot near the ni-th cycle, and a slope and an intercept of a number of cycles versus discharge capacity plot near the ni-th cycle, for example. These items are all single values, and the length per item is 1.

(2) The shaped data after the shaping can include the physical property values at specific points in time of each cycle of the charge and discharge cycle test. Items of values included in the shaped data include a charge start voltage of each cycle, a charge time of each cycle, a charge capacity of each cycle, and a discharge capacity of each cycle, for example. In this state, the length of each item is the cycle number ni at which the prediction is made.

(3) The data of the constant current charging step of the charge and discharge cycle is regarded as a function of voltage and processed. If there is a physical property value indicating a significant change with respect to a change in voltage, resampling is performed at a predetermined number of voltage resampling points. By performing this process for all cycles, the data is converted into data having a length of "the cycle number ni at which the prediction is made"×"the number of voltage resampling points", for one physical property. The current capacity is an example of the physical property value indicating a significant change with respect to the change in voltage.

(4) The data of the constant current discharge step of the charge and discharge cycle is processed in a manner similar to the data of the constant current charge step.

(5) In a case where the constant voltage charge step is present in the charge and discharge cycle, the data is regarded as a function of current and processed. If there is a physical property value indicating a significant change with respect to a change in current, resampling is performed at a predetermined number of current resampling points. By performing this process for all cycles, the data is converted into data having a length of "the cycle number ni at which the prediction is made"×"the number of current resampling points", for one physical property. The current capacity is an example of the physical property value indicating a significant change with respect to the change in current.

(6) In a case where a pause step is present in the charge and discharge cycle, the data is deleted.

(7) The values of the items acquired in steps (1) to (6) described above are connected in a column direction, to generate the fixed length data having the matrix format and amounting to one row.

A technique used for the resampling performed by the data shaping part C-1 may be a simple linear interpolation, a second order or higher order polynomial interpolation, a spline interpolation, or the like.

The feature extraction part C-2 receives the fixed length data output from the data shaping part C-1 as an input, compresses the fixed length data using a data compression technique, and outputs the compressed data. Examples of the data compression technique includes a dimension reduction technique, and the dimension reduction technique is preferably a principal component analysis. In a case where the principal component analysis is used, the data compression is preferably performed for each item connected in the column direction in the data in the matrix format. However, the item having a length 1 in the column direction is maintained as it is, without being subjected to the data compression. The principal component analysis extracts principal components from fixed length data. The number of principal components to be extracted must be determined in advance for each item. The number of principal components to be extracted is preferably selected to be sufficiently large, so that a cumulative proportion of the extracted principal components becomes greater than or equal to 90%.

The nonlinear conversion part C-3 receives the compressed data output from the feature extraction part C-2 as an input, performs a nonlinear conversion on the compressed data, and outputs nonlinear feature data mapped in a high dimensional space. The subsequent regression part C-4 receives the nonlinear feature data as an input, and outputs a probability distribution of the lifetime.

Techniques used in the nonlinear conversion part C-3 and the regression part C-4 may be set individually, but it is more preferable to use the Gaussian process regression having functions of both the nonlinear conversion part C-3 and the regression part C-4. In a case where the techniques are individually set, it is preferable to use the kernel method for the nonlinear conversion part C-3. The output of the regression part C-4 must be the probability distribution, and thus, the Bayesian ridge regression or the like can be used in place of the Gaussian process regression.

In the case where the Gaussian process regression is used for the nonlinear conversion part C-3 and the regression part C-4, and in the case where the kernel method is used in the nonlinear conversion part C-3, a nonlinear kernel, such as a radial basis function kernel or the like, is used so as to perform the nonlinear conversion.

By repeating steps S31 and S32, a set of learned lifetime prediction models Cni corresponding to one or more cycle numbers ni (i=1, 2, . . . ) at which the prediction is made, is acquired. Steps S41 and S42 are repeated as follows, with respect to the one or more cycle numbers ni at which the prediction is made, and the set of learned lifetime prediction models Cni.

In step S41, the charge and discharge cycle test is performed on the cell of the battery whose lifetime is to be predicted, up to the cycle number ni at which the prediction is made, so as to acquire the cycle measurement data Dni for prediction. The structure of the physical property values of the cycle measurement data Dni for prediction includes the structure of the physical property values of the cycle measurement data Ani for training.

In subsequent step S42, the cycle measurement data Dni for prediction is input to the learned lifetime prediction model Cni of the corresponding cycle number ni at which the prediction is made, and the probability distribution Eni of the predicted lifetime is acquired as the output. In a case where the cycle measurement data Dni for prediction includes an item of a physical property value not included in the cycle measurement data Ani for training, this item is deleted from the cycle measurement data Dni for prediction before the cycle measurement data Dni for prediction is input to the learned lifetime prediction model Cni.

The repetition of steps S41 and S42 may be performed for all of the one or more cycle numbers ni at which the prediction is made, however, if an operator judges that a sufficient confidence is obtained regarding the lifetime of the cell that is a prediction target, in view of the lifetime prediction result at an early cycle number at which the prediction is made, the prediction in the subsequent cycle number ni at which the prediction is made, may be omitted. In this case, the operator can end the charge and discharge cycle test of the cell that is the prediction target early.

Figure 5:
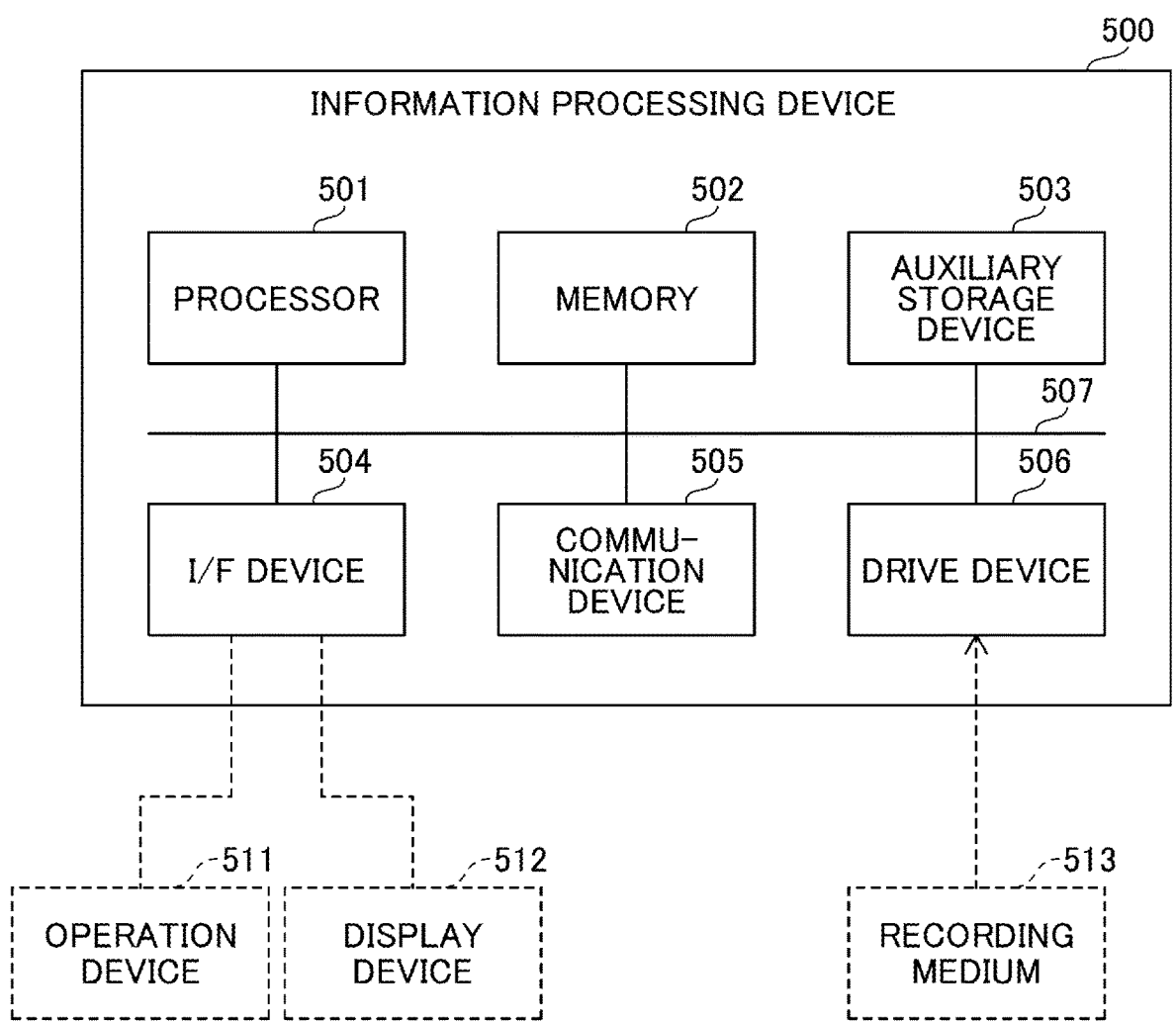
FIG. 5 is a diagram illustrating a hardware configuration of an information processing device that executes a lifetime prediction model used in the present invention.

FIG. 5 illustrates a hardware configuration of an information processing device that executes the lifetime prediction model described above. As illustrated in FIG. 5, an information processing device 500 includes a processor 501, a memory 502, an auxiliary storage device 503, an interface (I/F) device 504, a communication device 505, and a drive device 506. The hardware components of the information processing device 500 are connected to each other via a bus 507.

The processor 501 includes various computing devices, such as a central processing unit (CPU), and a graphics processing unit (GPU), or the like. The processor 501 reads various programs (for example, a lifetime prediction program or the like) into the memory 502, and executes the programs.

The memory 502 includes a main storage device, such as a read only memory (ROM), a random access memory (RAM), or the like. The processor 501 and the memory 502 form a so-called computer, and the computer can perform the functions described above when the processor 501 executes the various programs read into the memory 502.

The auxiliary storage device 503 stores the various programs, and various data that are used when the various programs are executed by the processor 501.

The I/F device 504 is a connection device that connects an operation device 511 and a display device 512 to the information processing device 500. The communication device 505 is a communication device for communicating with an external apparatus, that is not illustrated, via a network. The drive device 506 is a device to which a recording medium 513 is set.

The various programs installed in the auxiliary storage device 503 are installed by setting the recording medium 513 that is distributed to the drive device 506, and reading the various programs recorded in the recording medium 513 by the drive device 506, for example. Alternatively, the various programs installed in the auxiliary storage device 503 may be installed by being downloaded from the network via the communication device 505.

Exemplary Implementations

Hereinafter, exemplary implementations based on the present embodiment will be described.

In the present exemplary implementation, the charge and discharge cycle test is performed on each cell of 104 lithium ion batteries in step S1, to acquire the cycle measurement data A for training and the lifetime data B for training. The charge and discharge cycle of the charge and discharge cycle test is formed of five steps including constant current charge step, constant voltage charge step, pause step, constant current discharge step, and pause step, and three items, namely, the voltage applied to the cell, the current flowing through the cell, and the current capacity, are recorded as physical property values included in the cycle measurement data.

Figure 6:
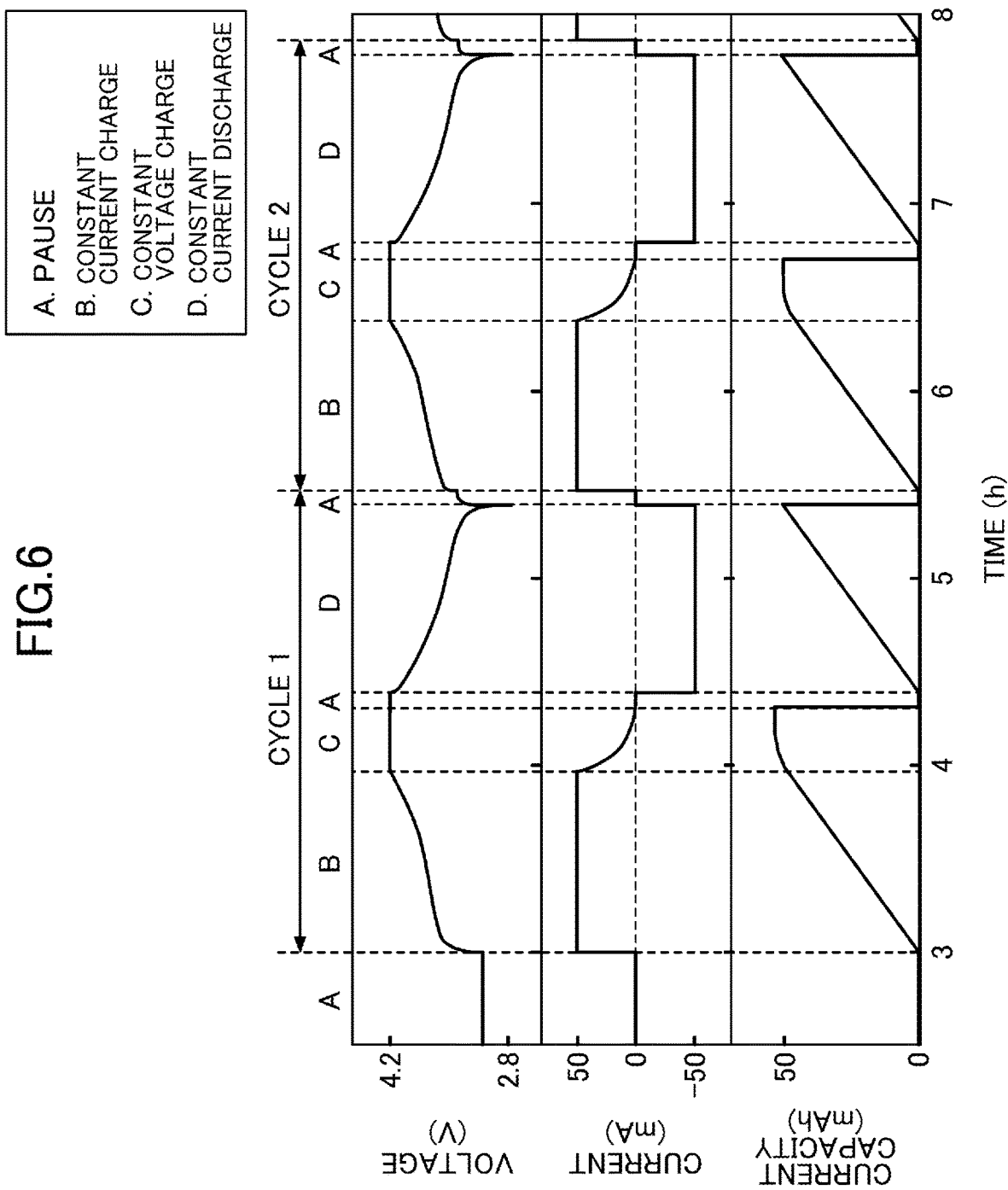
FIG. 6 is a graph in which some of the cycle measurement data used in an exemplary implementation are extracted and plotted.

FIG. 6 is a graph in which some of the cycle measurement data used in the exemplary implementation are extracted and plotted. More particularly, data from before the start of the first cycle to after the end of the second cycle of one cell is extracted from the cycle measurement data A for training acquired in the exemplary implementation, and plotted with respect to the ordinate indicating the time, and the abscissa indicating the voltage, the current, and the current capacity. As illustrated in FIG. 6, in the charge and discharge cycle test of this exemplary implementation, a voltage range is from 2.8 V to 4.2 V, and a current range is from −50 mA to 50 mA. The plots form a smooth curve or a straight line in each step, and it may be seen that the sampling time is appropriately selected so as to sufficiently follow the changes in the physical property values.

In this exemplary implementation, the cycle life is defined as the number of cycles at which the discharge capacitance of the cell is less than 80% of the first cycle, and the charge and discharge cycle test for acquiring the lifetime data for training B in step S1 is performed for 2,000 cycles for the short test, and for 4,000 cycles for the longest test. For some of the cells that did not reach the cycle life, the cycle life is estimated using a combination of the transition of the discharge capacity acquired as the measured value and the power law. The estimated cycle life is used as the lifetime data B for training under a condition that a root mean square error of curve fitting by the power law is less than 0.001 mAh. As a result, the number of cells included in the cycle measurement data A for training and the lifetime data B for training of this exemplary example is 70, and a range of the lifetime included in the lifetime data B for training is approximately 500 cycles to approximately 6,000 cycles.

As the cycle number ni at which the prediction is made, determined in step S2, 10 cycle numbers are selected in this exemplary implementation from 100 cycles to 1,000 cycles in increments of 100 cycles.

With respect to the 10 cycle numbers ni at which the prediction is made, determined in step S2, step S31 of extracting the cycle measurement data from the cycle measurement data A for training to the cycle number ni at which the prediction is made, as the cycle measurement data Ani for training, and step S32 of learning the lifetime prediction model C using the extracted cycle measurement data Ani for training as an explanatory variable, and the data of the lifetime data B for training converted into the logarithm as the response variable, to acquire the learned lifetime prediction model Cni of the cycle number ni at which the prediction is made, are repeated.

The details of the lifetime prediction model in this exemplary implementation are as follows.

The data shaping part C-1 receives the cycle measurement data up to the cycle number ni at which the prediction is made, as the input, and outputs the fixed length data having the matrix format in which the number of rows is the number of cells, and the number of columns is the fixed length. The fixed length data in the present exemplary implementation is generated by converting the cycle measurement data of each cell into data in which the number of columns is the fixed length, by a shaping process including the following processes (1) through (7), and superimposing the converted data in the row direction.

(1) 33 items are included as the physical property values at specific points in time of the charge and discharge cycle test, and the values calculated using the physical property values, namely, a charge start voltage of the first cycle, a charge start voltage of the second cycle, a charge start voltage of the ni-th cycle, a total charge time of the first cycle, a total charge time of the second cycle, a total charge time of the ni-th cycle, a constant voltage charge time of the first cycle, a constant voltage charge time of the second cycle, a constant voltage charge time of the ni-th cycle, a total charge capacity of the first cycle, a total charge capacity of the second cycle, a total charge capacity of the ni-th cycle, a constant voltage charge capacity of the first cycle, a constant voltage charge capacity of the second cycle, a constant voltage charge capacity of the ni-th cycle, a discharge capacity of the first cycle, a discharge capacity of the second cycle, a discharge capacity of the ni-th cycle, a discharge capacity retention rate of the ni-th cycle, a slope and an intercept of the number of cycles versus charge start voltage plot near the ni-th cycle, a slope and an intercept of the number of cycles versus total charge time plot near the ni-th cycle, a slope and an intercept of the number of cycles versus constant voltage charge time plot near the ni-th cycle, and a slope and an intercept of the number of cycles versus total charge capacity plot near the ni-th cycle, a slope and an intercept of the number of cycles versus constant voltage charge capacity plot near the ni-th cycle, a slope and an intercept of the number of cycles versus discharge capacity plot near the ni-th cycle, and a slope and an intercept of the number of cycles versus discharge capacity retention rate plot near the ni-th cycle. These items are all single values, and the length per item is 1.

(2) 7 items are included as the physical property values at specific points in time of each cycle of the charge and discharge cycle test, namely, the charge start voltage of each cycle, the total charge time of each cycle, the constant voltage charge time of each cycle, the total charge capacity of each cycle, the constant voltage charge capacity of each cycle, the discharge capacity of each cycle, and the discharge capacity retention rate of each cycle. The length of each item is the cycle number ni at which the prediction is made.

(3) The data of the current capacity in the constant current charging step of the charge and discharge cycle is regarded as a function of voltage, and the resampling is performed by linear interpolation on 101 voltage sampling points sampled at constant intervals in the voltage range of 2.8 V to 4.2 V in this exemplary implementation. By performing this process for all cycles, the conversion is made to the data having a length of "the cycle number ni at which the prediction is made"דthe number of voltage resampling points, 101".

(4) The data of the current capacity in the constant current discharge step of the charge and discharge cycle is processed in a manner similar to the data of the current capacity in the constant current charge step.

(5) The current capacity and time in the constant voltage charge step of the charge and discharge cycle are regarded as a function of current, and the resampling is performed by linear interpolation on 101 current sampling points sampled at constant intervals in the current range of −50 mA to 50 mA in this exemplary implementation. By performing this process for all cycles, the current capacity and time are converted into data having a length of "the cycle number ni at which the prediction is made"דthe number of voltage resampling points, 101", respectively.

(6) The data in pause step of the charge and discharge cycle are deleted.

(7) The 33 items having the length 1, the 7 items having the length ni, and the 4 items having the length ni×101, acquired by the processes (1) through (6) of the shaping process, are connected in the column direction to generate the fixed length data having the matrix format and amounting to one row.

7A of FIG. 7 is a graph in which the current capacity in the constant current discharge step of the charge and discharge cycle before performing the process (4) of the shaping process of the data shaping part C-1 is plotted against the voltage. Three plots indicate the current capacity at different numbers of cycles, with the number of samples and the sampling position of the voltage being different among the plots. 7B of FIG. 7 is a graph in which the current capacity obtained by performing the process (4) of the shaping process on the data illustrated in 7A of FIG. 7, is resampled at the sampling points of a common voltage, and the resampled current capacity is plotted against the voltage.

The feature extraction part C-2 receives the fixed length data output from the data shaping part C-1 as the input, compresses the fixed length data using a data compression technique, and outputs the compressed data. In this exemplary implementation, the principal component analysis is employed as the data compression technique, and the principal component analysis is separately applied to each item connected in the column direction within the fixed length data having the matrix format, to acquire compressed data. In this state, the principal component analysis is not applied to the 33 items only having the length 1 in the column direction, and these 33 items are maintained as they are. The number of principal components extracted by the principal component analysis is selected to be sufficiently large, so that the cumulative proportion of the extracted principal components is greater than or equal to 90%. More particularly, 10 principal components are extracted for each of the 7 items having the length of the cycle number ni at which the prediction is made, in the column direction, and 20 principal components are extracted for each of the 4 items having the length of "the cycle number ni at which the prediction is made"×101 in the column direction.

The nonlinear conversion part C-3 receives the compressed data output from the feature extraction part C-2 as the input, performs the nonlinear conversion on the compressed data, and outputs the nonlinear feature data. The subsequent regression part C-4 receives the nonlinear feature data as the input, and outputs the probability distribution of the lifetime. In this exemplary implementation, the Gaussian process regression having the functions of both the nonlinear conversion part C-3 and the regression part C-4, is employed, and a sum of a radial basis function kernel, a constant kernel, and a white kernel is used as the kernel.

By repeating steps S31 and S32, a set of the learned lifetime prediction models Cni corresponding to the 10 cycle numbers ni at which the prediction is made, respectively, are acquired. Steps S41 and S42 are repeated as follows, with respect to the 10 ni and Cni in this exemplary implementation.

In step S41 of this exemplary implementation, the charge and discharge cycle test is performed up to the cycle number ni at which the prediction is made, with respect to the two cells whose lifetimes are to be predicted, so as to acquire the cycle measurement data Dni for prediction. The structure of the cycle measurement data Dni for prediction is the same as the structure of the cycle measurement data Ani for training in this exemplary implementation.

In subsequent step S42, the cycle measurement data Dni for prediction is input to the learned lifetime prediction model Cni of the corresponding cycle number ni at which the prediction is made, and the logarithm of the probability distribution Eni of the lifetime is acquired as the output.

FIG. 8 is a graph in which an average value and a 95% confidence interval acquired from the logarithm of the probability distribution Eni of the lifetime, are inversely converted from the logarithm, and plotted with respect to each of the two cells. "□" indicates the average value of the lifetime, and each pair of horizontal lines in an up-down direction indicates the 95% confidence interval of the lifetime.

The two cells, that are the prediction targets, are illustrated separately in 8A of FIG. 8 and in 8B of FIG. 8. Because the cell corresponding to the 8A of FIG. 8 reached the cycle life at 668 cycles of the charge and discharge cycle test, no prediction was made after 700 cycles. The actual lifetime of 668 cycles is indicated by a broken line in the 8A of FIG. 8. The cell corresponding to 8B of FIG. 8 did not reach the cycle life even at 1,000 cycles, that is the last cycle number at which the prediction is made. For verification purposes, the charge and discharge cycle test was thereafter continued up to 1,400 cycles, and the actual cycle life was estimated to be 4,650 cycles using the combination of the acquired discharge capacity and the power law. The root mean square error of the curve fitting was less than 0.001 mAh. The estimated actual lifetime of 4650 cycles is indicated by a broken line in 8B of FIG. 8.

In both 8A of FIG. 8 and 8B of FIG. 8, the average value "□" of the predicted lifetime is a value close to the actual lifetime or the estimated actual lifetime of the target cell, and it can be seen that the predicted 95% confidence intervals converge to the actual lifetime or the estimated actual lifetime as the cycle number at which the prediction is made increases. If the operator judges that the 95% confidence interval has become sufficiently narrow, the prediction at the subsequent cycle number at which the prediction is made can be omitted, and the charge and discharge cycle test can be ended early.

Second Embodiment

In the first embodiment described above, the probability distribution of the lifetime is predicted as a prediction item predicted based on the cycle measurement data for prediction. However, the prediction item is not limited to the probability distribution of the lifetime. For example, it is possible to further predict the discharge capacity retention rate from the cycle number at which the prediction is made until the predicted lifetime is reached, or in each cycle until the predicted lifetime is exceeded. In the following, the second embodiment will mainly be described by referring to differences from the first embodiment.

First, the discharge capacity retention rate in each cycle, that is a newly provided prediction item in the second embodiment, will be described. FIG. 9 is a graph illustrating the discharge capacity retention rate up to the cycle number at which the prediction is made, and the predicted discharge capacity retention rate after the cycle number at which the prediction is made.

Similar to FIG. 1, the abscissa in FIG. 9 indicates the number of cycles, and the ordinate in FIG. 9 indicates the discharge capacity retention rate.

In FIG. 9, a reference numeral 910 denotes a graph of the cycle measurement data for prediction acquired up to the cycle number at which the prediction is made.

In addition, a reference numeral 920 denotes a plot of the predicted discharge capacity retention rate at an arbitrary number of cycles (for example, the number of cycles=200, 300, 400, . . . or the like) after the cycle number at which the prediction is made, and a line graph connecting each plot.

Further, reference numerals 921 and 922 denote a line graph connecting upper limit values, and a line graph connecting lower limit values, respectively, of each 95% confidence interval when the predicted discharge capacity retention rate is calculated at an arbitrary number of cycles after the cycle number at which the prediction is made.

Accordingly, by displaying the predicted discharge capacity retention rate in each cycle until the predicted lifetime is reached, the operator can grasp a transition of the predicted discharge capacity retention rate until the predicted lifetime is reached.

In the example of FIG. 9, the average value of the lifetime (reference numeral 930), and the 95% confidence interval of the lifetime (reference numeral 931) are displayed together as the probability distribution of the lifetime.

Next, procedures of the lifetime prediction method according to the second embodiment will be described. FIG. 10 is a flow chart illustrating the procedures of the lifetime prediction method according to the second embodiment of the present invention. Steps S12, S33, and S43 differ from the flow chart described above with reference to FIG. 2 for the first embodiment.

In step S12, a discharge capacity retention rate B' in each cycle is calculated, by continuing the charge and discharge cycle test until the cycle life is reached in step S11.

In step S33, the discharge capacity retention rate prediction model C' is learned, using the extracted cycle measurement data Ani for training as an explanatory variable, and the discharge capacity retention rate B' as a response variable, to acquire a learned discharge capacity retention rate prediction model C'ni of the cycle number ni at which the prediction is made.

In steps S31 and S33, a learned discharge capacity retention rate prediction model C'ni, acquired by learning the cycle measurement data up to the initial ni cycles, corresponding to the cycle number ni at which the prediction is made, is prepared. That is, in a case where a plurality of cycle numbers at which the prediction is made is selected, a plurality of discharge capacity retention rate prediction models C'ni for each initial ni cycles corresponding to the cycle number ni at which the prediction is made, is learned.

As described above, the initial ni cycles is intended to refer to the first cycle to the 200th cycle in the case of initial 200 cycles, for example. The discharge capacity retention rate prediction model C'200 is learned by using the cycle measurement data A200 for training, acquired by extracting the initial 200 cycles from the first cycle to the 200th cycle of the cycle measurement data A for training, and the discharge capacity retention rate B' in each cycle. The learned discharge capacity retention rate prediction model C'200 outputs a probability distribution E'200 of the predicted discharge capacity retention rate when the cycle measurement data D200 for prediction up to the cycle number 200 at which the prediction is made are input.

The predicted discharge capacity retention rate, that is a response variable, usually has a value greater than 0 and smaller than the discharge capacity retention rate at the cycle number at which the prediction is made. For this reason, when learning the discharge capacity retention rate prediction model C' in step S33, it is desirable not to learn the discharge capacity retention rate B' as it is, but to learn a value converted according to the following formula (1). In this case, the predicted discharge capacity retention rate also becomes the value converted according to the following formula (1), and it is possible to ensure ensured that the predicted discharge capacity retention rate acquired by the inverse conversion is has the value greater than 0 and smaller than the discharge capacity retention rate at the cycle number at which the prediction is made.

$$\text{Converted value} = \log(y_{mi}/(y_{ni} - y_{mi}))  \quad \text{Formula (1):}$$

Here, $y_{mi}$ denotes the predicted discharge capacity retention rate at a cycle number $mi$ at which a prediction is desired, and $y_{ni}$ denotes the discharge capacity retention rate at the cycle number $ni$ at which a prediction is made.

In step S43, the cycle measurement data Dni for prediction is input to the learned discharge capacity retention rate prediction model C'ni of the corresponding cycle number ni at which the prediction is made, to acquire a probability distribution E'ni of the discharge capacity retention rate in each cycle, as an output.

In addition, the predicted discharge capacity retention rate and the 95% confidence interval are acquired from the probability distribution E'ni of the converted value of the acquired discharge capacity retention rate according to the formula (1), and are subjected to the inverse conversion, so as to acquire the plots illustrated in FIG. 9.

FIG. 11 illustrates a structure of the cycle measurement data and the discharge capacity retention rate data. Because the details of the cycle measurement data are already described above with reference to FIG. 3 for the first embodiment, a description thereof will be omitted.

The discharge capacity retention rate refers the discharge capacity retention rate at each cycle of each cell from which the cycle measurement data are acquired. The example of FIG. 11 indicates that the discharge capacitance retention rate at a cycle m1, the discharge capacitance retention rate at a cycle m2, . . . , or the like are included.

Next, the structure of the lifetime prediction and discharge capacity retention rate prediction model used in the second embodiment will be described. FIG. 12 is a block diagram schematically illustrating a structure of the lifetime prediction and discharge capacity retention rate prediction model used in the second embodiment of the present invention.

As illustrated in FIG. 12, the lifetime prediction and discharge capacity retention rate prediction model in the second embodiment includes a data shaping part C-1, a feature extraction part C-2, a nonlinear conversion part C-3, a regression part C-4, a nonlinear conversion part C'-3, and a regression part C'-4. The lifetime prediction and discharge capacity retention rate prediction model receives the prediction cycle measurement data up to the cycle number ni at which the prediction is made, as an input, and outputs the probability distribution of the lifetime, and the probability distribution of the discharge capacity retention rate of each cycle.

Hereinafter, as an example, constituent elements of the lifetime prediction and the discharge capacity retention rate prediction model will be described. However, because the data shaping part C-1 through the regression part C-4 are already described above with reference to FIG. 4 for the first embodiment, the nonlinear conversion part C'-3 and the regression part C'-4 will be described hereinafter.

The nonlinear conversion part C'-3 receives the compressed data output from the feature extraction part C-2 as an input, performs a nonlinear conversion on the compressed data, and outputs nonlinear feature data mapped. The subsequent regression part C'-4 receives the nonlinear feature data as an input, and outputs a probability distribution of the discharge capacity retention rate in each cycle.

The technique used in the nonlinear conversion part C'-3 and the technique used in the regression part C'-4 may be set separately, but it is more preferable to use the Gaussian process regression having functions of both the nonlinear conversion part C'-3 and the regression part C'-4. In a case where the techniques are individually set, it is preferable to use the kernel method for the nonlinear conversion part C'-3. The output of the regression part C'-4 must be the probability distribution, and thus, the Bayesian ridge regression or the like can be used in place of the Gaussian process regression.

In the case where the Gaussian process regression is used for the nonlinear conversion part C'-3 and the regression part C'-4, and in the case where the kernel method is used in the nonlinear conversion part C'-3, the nonlinear kernel, such as the radial basis function kernel or the like, is used so as to perform the nonlinear conversion.

As described above, according to the second embodiment, based on the cycle measurement data for prediction, it is possible to predict the probability distribution of the lifetime, and the predicted discharge capacity retention rate and the 95% confidence interval in each cycle from the cycle number at which the prediction is made until the predicted lifetime is reached or until the predicted lifetime is exceeded.

Other Embodiments

In the second embodiment described above, the prediction of the probability distribution of the lifetime and the prediction of the probability distribution of the discharge capacity retention rate are performed using an integrated model (the lifetime prediction and discharge capacity retention rate prediction model). However, the prediction of the probability distribution of the lifetime and the prediction of the probability distribution of the discharge capacity retention rate may be performed using separate models (a lifetime prediction model and a discharge capacity retention rate prediction model). More particularly, a lifetime prediction program and a discharge capacity retention rate prediction program may be separately prepared, and the information processing device 500 may be configured to independently execute each of these programs.

This application is based upon and claims priority to Japanese Patent Application No. 2020-174106, filed on Oct. 15, 2020, the entire contents of which are incorporated herein by reference.

INDUSTRIAL APPLICABILITY

The lithium ion battery lifetime prediction method according to the present invention can suitably be used for the lifetime evaluation in the development of the lithium ion batteries.

The invention claimed is:

1. A computer-implemented lithium ion battery lifetime prediction method comprising:
   acquiring training data including cycle measurement data and lifetime data of a battery;
   training a lifetime prediction model using the training data with respect to one or more cycle numbers at which a prediction is made, to acquire a set of trained lifetime prediction models corresponding to the cycle numbers at which the prediction is made, respectively;
   successively acquiring cycle measurement data for prediction of a battery that is a prediction target, up to the cycle numbers at which the prediction is made, respectively; and
   inputting the cycle measurement data for prediction acquired up to the cycle numbers at which the prediction is made, to the trained lifetime prediction models of the corresponding cycle numbers at which the prediction is made, to acquire a probability distribution of a lifetime at the cycle numbers at which the prediction is made, respectively, as an output,
   wherein the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data.

2. The computer-implemented lithium ion battery lifetime prediction method as claimed in claim 1, wherein the lifetime prediction model includes
   a data shaping part configured to shape the cycle measurement data into fixed length data,
   a feature extraction part configured to compresses the fixed length data into compressed data,
   a nonlinear conversion part configured to convert the compressed data into nonlinear feature data mapped in a high dimensional space, and
   a regression part configured to receive the nonlinear feature data as an input, and to output the probability distribution of the lifetime, that are coupled in this order.

3. The computer-implemented lithium ion battery lifetime prediction method as claimed in claim 2, wherein the feature extraction part uses a dimension reduction technique as a data compression technique.

4. The computer-implemented lithium ion battery lifetime prediction method as claimed in claim 3, wherein the dimension reduction technique is a principal component analysis.

5. The computer-implemented lithium ion battery lifetime prediction method as claimed in claim 3, wherein:
the data shaping part receives cycle measurement data $An_i$ for training, amounting to initial ni cycles extracted from the cycle measurement data of each cell of the battery, generates the fixed length data by arranging a value of each measured item of each cycle in a direction in which a number of columns increases, and arranges the generated fixed length data in a direction in which a number of rows increases for a number of cells of the battery, to acquire the fixed length data having the matrix format, where i is an integer greater than or equal to 1, and
the feature extraction part compresses the fixed length data having the matrix format into the compressed data.

6. The computer-implemented lithium ion battery lifetime prediction method as claimed in claim 1, wherein the lifetime prediction model comprises a data shaping part that resamples current capacity data at voltage sampling points within a specific voltage range for each cycle, and produces data having a matrix format specifically tailored for principal component analysis and Gaussian process regression.

7. A computer-implemented discharge capacity retention prediction method for a lithium ion battery, comprising:
acquiring training data including cycle measurement data of a battery and a discharge capacity retention rate in each cycle;
learning a discharge capacity retention rate in each cycle using the training data, with respect to one or more cycle numbers at which a prediction is made, to acquire a set of trained discharge capacity retention rate prediction models corresponding to the cycle numbers at which the prediction is made, respectively;
successively acquiring cycle measurement data for prediction of a battery that is a prediction target, up to the cycle numbers at which the prediction is made, respectively; and
inputting the cycle measurement data for prediction acquired up to the cycle numbers at which the prediction is made, to the trained discharge capacity retention rate prediction models of the corresponding cycle numbers at which the prediction is made, to acquire a probability distribution of a discharge capacity retention rate at cycles from the cycle numbers at which the prediction is made to a lifetime, respectively, as an output,
wherein the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data.

8. The computer-implemented discharge capacity retention prediction method for the lithium ion battery as claimed in claim 7, wherein:
the learning the discharge capacity retention rate trains the lifetime prediction model, using cycle measurement data $An_i$ for training, amounting to initial $n_i$ cycles extracted from the cycle measurement data of each cell of the battery of the training data, as an explanatory variable, and a discharge retention capacity rate B' in each cycle of each cell, as a response variable, with respect to the one or more cycle numbers ni at which the prediction is made, to acquire a set of trained discharge capacity retention rate prediction models $C'n_i$ corresponding to the cycle numbers ni at which the prediction is made, respectively, where i is an integer greater than or equal to 1,
the successively acquiring the cycle measurement data performs a charge and discharge cycle test including a constant current charging process and a subsequent constant current discharge process with respect to each cell of the battery that is the prediction target, for cycle numbers $n_x$ at which the prediction is made, respectively, to acquire the cycle measurement data for prediction recorded with a voltage applied to each cell of the battery that is the prediction target, a current flowing through each cell of the battery that is the prediction target, and a current capacity, where x is an integer greater than or equal to 1, and
the inputting the cycle measurement data inputs the cycle measurement data for prediction acquired up to the cycle numbers nx at which the prediction is made, to the trained discharge capacity retention rate prediction models $C'n_i$ of the corresponding cycle numbers $n_i$ at which the prediction is made, and acquires the probability distribution of the discharge capacity retention rate at the cycle numbers nx at which the prediction is made, respectively, as the output, where i=x.

9. The computer-implemented discharge capacity retention prediction method for the lithium ion battery as claimed in claim 8, wherein the lifetime prediction model includes:
a data shaping part that receives the cycle measurement data up to the cycle number ni at which the prediction is made, as the input, and outputs the fixed length data having the matrix format in which the number of rows is the number of cells, and the number of columns is the fixed length, a feature extraction part that receives the fixed length data output from the data shaping part as the input, compresses the fixed length data using a data compression technique, and outputs the compressed data,
a first nonlinear conversion part that receives the compressed data output from the feature extraction part as the input, performs a nonlinear conversion on the compressed data, and outputs first nonlinear feature data mapped in a high dimensional space,
a first regression part that receives the first nonlinear feature data as the input, and outputs the probability distribution of the lifetime,
a second nonlinear conversion part that receives the compressed data output from the feature extraction part as an input, performs a nonlinear conversion on the compressed data, and outputs second nonlinear feature data mapped in the high dimensional space, and
a second regression part that receives the second nonlinear feature data as an input, and outputs a probability distribution of the discharge capacity retention rate in each cycle, so that the lifetime prediction model is specifically configured to reduce charge and discharge cycle test time by enabling early termination of physical testing based on the acquired probability distribution, thereby improving battery development throughput.

10. The computer-implemented discharge capacity retention prediction method for the lithium ion battery as claimed in claim 7, wherein the lifetime prediction model comprises a data shaping part that resamples current capacity data at voltage sampling points within a specific voltage range for each cycle, and produces data having a matrix format specifically tailored for principal component analysis and Gaussian process regression.

11. A non-transitory computer-readable recording medium having recorded therein a lifetime prediction program for causing a computer to execute a process comprising:
acquiring training data including cycle measurement data and lifetime data of a battery;
training a lifetime prediction model using the training data, with respect to one or more cycle numbers at which a prediction is made, to acquire a set of trained lifetime prediction models corresponding to the cycle numbers at which the prediction is made, respectively;
successively acquiring cycle measurement data for prediction of a battery that is a prediction target, up to the cycle numbers at which the prediction is made, respectively; and
inputting the cycle measurement data for prediction acquired up to the cycle numbers at which the prediction is made, to the trained lifetime prediction models of the corresponding cycle numbers at which the prediction is made, to acquire a probability distribution of a lifetime at the cycle numbers at which the prediction is made, respectively, as an output,
wherein the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data.

12. A non-transitory computer-readable recording medium having recorded therein a discharge capacity retention rate prediction program for causing a computer to execute a process comprising:
acquiring training data including cycle measurement data of a battery and a discharge capacity retention rate in each cycle;
learning a discharge capacity retention rate in each cycle using the training data, with respect to one or more cycle numbers at which a prediction is made, to acquire a set of trained discharge capacity retention rate prediction models corresponding to the cycle numbers at which the prediction is made, respectively;
successively acquiring cycle measurement data for prediction of a battery that is a prediction target, up to the cycle numbers at which the prediction is made, respectively; and
inputting the cycle measurement data for prediction acquired up to the cycle numbers at which the prediction is made, to the trained discharge capacity retention rate prediction models of the corresponding cycle numbers at which the prediction is made, to acquire a probability distribution of a discharge capacity retention rate at cycles from the cycle numbers at which the prediction is made to a lifetime, respectively, as an output,
wherein the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data.

13. An information processing device comprising:
a memory configured to store a program; and
a processor configured to execute the program and perform a process including
acquiring training data including cycle measurement data and lifetime data of a battery;
training a lifetime prediction model using the training data with respect to one or more cycle numbers at which a prediction is made, to acquire a set of trained lifetime prediction models corresponding to the cycle numbers at which the prediction is made, respectively;
successively acquiring cycle measurement data for prediction of a battery that is a prediction target, up to the cycle numbers at which the prediction is made, respectively; and
inputting the cycle measurement data for prediction acquired up to the cycle numbers at which the prediction is made, to the trained lifetime prediction models of the corresponding cycle numbers at which the prediction is made, to acquire a probability distribution of a lifetime at the cycle numbers at which the prediction is made, respectively, as an output,
wherein the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data.

14. An information processing device comprising:
a memory configured to store a program; and
a processor configured to execute the program and perform a process including
acquiring training data including cycle measurement data of a battery and a discharge capacity retention rate in each cycle;
learning a discharge capacity retention rate in each cycle using the training data, with respect to one or more cycle numbers at which a prediction is made, to acquire a set of trained discharge capacity retention rate prediction models corresponding to the cycle numbers at which the prediction is made, respectively;
successively acquiring cycle measurement data for prediction of a battery that is a prediction target, up to the cycle numbers at which the prediction is made, respectively; and
inputting the cycle measurement data for prediction acquired up to the cycle numbers at which the prediction is made, to the trained discharge capacity retention rate prediction models of the corresponding cycle numbers at which the prediction is made, to acquire a probability distribution of a discharge capacity retention rate at cycles from the cycle numbers at which the prediction is made to a lifetime, respectively, as an output, wherein the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data.

15. A computer-implemented lithium ion battery lifetime prediction method comprising:

acquiring training data including cycle measurement data and lifetime data of a battery;

training a lifetime prediction model using the training data with respect to one or more cycle numbers at which a prediction is made, to acquire a set of trained lifetime prediction models corresponding to the cycle numbers at which the prediction is made, respectively;

successively acquiring cycle measurement data for prediction of a battery that is a prediction target, up to the cycle numbers at which the prediction is made, respectively; and inputting the cycle measurement data for prediction acquired up to the cycle numbers at which the prediction is made, to the trained lifetime prediction models of the corresponding cycle numbers at which the prediction is made, to acquire a probability distribution of a lifetime at the cycle numbers at which the prediction is made, respectively, as an output, wherein:

the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data, the training the lifetime prediction model trains the lifetime prediction model, using cycle measurement data $An_i$ for training, amounting to initial ni cycles extracted from the cycle measurement data of each cell of the battery of the training data, as an explanatory variable, and the lifetime data of the training data, as a response variable, with respect to the one or more cycle numbers $n_i$ at which the prediction is made, to acquire a set of trained lifetime prediction models $Cn_i$ corresponding to the cycle numbers $n_i$ at which the prediction is made, respectively, where i is an integer greater than or equal to 1, the successively acquiring the cycle measurement data performs a charge and discharge cycle test including a constant current charging process and a subsequent constant current discharge process with respect to each cell of the battery that is the prediction target, for cycle numbers $n_x$ at which the prediction is made, respectively, to acquire the cycle measurement data for prediction recorded with a voltage applied to each cell of the battery that is the prediction target, a current flowing through each cell of the battery that is the prediction target, and a current capacity, where x is an integer greater than or equal to 1, and the inputting the cycle measurement data inputs the cycle measurement data for prediction acquired up to the cycle numbers $n_x$ at which the prediction is made, to the trained lifetime prediction models $Cn_i$ of the corresponding cycle numbers ni at which the prediction is made, and acquires the probability distribution of the lifetime at the cycle numbers nx at which the prediction is made, respectively, as the output, where i=x.

16. A computer-implemented lithium ion battery lifetime prediction method comprising:

acquiring training data including cycle measurement data and lifetime data of a battery;

training a lifetime prediction model using the training data with respect to one or more cycle numbers at which a prediction is made, to acquire a set of trained lifetime prediction models corresponding to the cycle numbers at which the prediction is made, respectively;

successively acquiring cycle measurement data for prediction of a battery that is a prediction target, up to the cycle numbers at which the prediction is made, respectively; and inputting the cycle measurement data for prediction acquired up to the cycle numbers at which the prediction is made, to the trained lifetime prediction models of the corresponding cycle numbers at which the prediction is made, to acquire a probability distribution of a lifetime at the cycle numbers at which the prediction is made, respectively, as an output, wherein:

the acquiring the training data performs a charge and discharge cycle test including a constant current charging process and a subsequent constant current discharge process with respect to each cell of the battery, to acquire the training data, including the cycle measurement data recorded with a voltage applied to each cell of the battery, a current flowing through each cell of the battery, and a current capacity, and the lifetime data, the training the lifetime prediction model trains the lifetime prediction model, using cycle measurement data $An_i$ for training, amounting to initial $n_i$ cycles extracted from the cycle measurement data of each cell of the battery of the training data, as an explanatory variable, and the lifetime data of the training data, as a response variable, with respect to the one or more cycle numbers $n_i$ at which the prediction is made, to acquire a set of trained lifetime prediction models Cni corresponding to the cycle numbers $n_i$ at which the prediction is made, respectively, where i is an integer greater than or equal to 1, the successively acquiring the cycle measurement data performs a charge and discharge cycle test including a constant current charging process and a subsequent constant current discharge process with respect to each cell of the battery that is the prediction target, for cycle numbers $n_x$ at which the prediction is made, respectively, to acquire the cycle measurement data for prediction recorded with a voltage applied to each cell of the battery that is the prediction target, a current flowing through each cell of the battery that is the prediction target, and a current capacity, where x is an integer greater than or equal to 1, and the inputting the cycle measurement data inputs the cycle measurement data for prediction acquired up to the cycle numbers nx at which the prediction is made, to the trained lifetime prediction models Cni of the corresponding cycle numbers ni at which the prediction is made, and acquires the probability distribution of the lifetime at the cycle numbers nx at which the prediction is made, respectively, as the output, where i=x, and the lifetime prediction model includes:
- a data shaping part that receives the cycle measurement data up to the cycle number $n_i$ at which the prediction is made, as the input, and outputs fixed length data having a matrix format in which the number of rows is the number of cells and the number of columns is a fixed length,
- a feature extraction part that receives the fixed length data output from the data shaping part as an input, compresses the fixed length data using a data compression technique, and outputs the compressed data,
- a nonlinear conversion part that receives the compressed data output from the feature extraction part as an input, performs a nonlinear conversion on the compressed data, and outputs nonlinear feature data mapped in a high dimensional space, and
- a regression part that receives the nonlinear feature data as an input, and outputs a probability distribution of the lifetime, so that the lifetime prediction model is specifically configured to reduce charge and discharge cycle test time by enabling early termination of physical testing based on the acquired probability distribution, thereby improving battery development throughput.

* * * * *